United States Patent
Fujimoto

(10) Patent No.: US 6,263,200 B1
(45) Date of Patent: Jul. 17, 2001

(54) RADIO TERMINAL APPARATUS EQUIPPED WITH BATTERY POWER SAVING FUNCTION, AND MOBILE COMMUNICATION SYSTEM USING THE SAME

(75) Inventor: Koji Fujimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/997,306

(22) Filed: Dec. 23, 1997

(30) Foreign Application Priority Data

Dec. 26, 1996 (JP) .................................................. 8-348552

(51) Int. Cl.⁷ ...................................................... H04B 1/16
(52) U.S. Cl. ........................... 455/343; 455/574; 455/38.3
(58) Field of Search ..................................... 455/574, 575, 455/38.3, 127, 67.7, 343, 3.3, 226.1, 159.2

(56) References Cited

U.S. PATENT DOCUMENTS

| | | | |
|---|---|---|---|
| 3,963,992 | * 6/1976 | Hekimian et al. | 455/226.1 |
| 4,521,912 | * 6/1985 | Franke et al. | 455/126 |
| 4,839,639 | 6/1989 | Sato et al. | 340/825.44 |
| 4,852,148 | 7/1989 | Shibata et al. | 379/59 |
| 4,908,523 | * 3/1990 | Snowden | 307/43 |
| 5,239,694 | * 8/1993 | Toyoshima | 455/127 |
| 5,265,271 | * 11/1993 | Marko et al. | 455/127 |
| 5,355,518 | * 10/1994 | Kindinger et al. | 455/343 |
| 5,369,798 | * 11/1994 | Lee | 455/574 |
| 5,430,437 | 7/1995 | Ichikawa et al. | 340/825.44 |
| 5,497,507 | * 3/1996 | Komaki | 455/127 |
| 5,507,039 | * 4/1996 | Honma | 455/343 |
| 5,627,882 | * 5/1997 | Chien et al. | 455/574 |
| 5,649,315 | * 7/1997 | Eaton | 455/38.3 |
| 5,678,229 | * 10/1997 | Seki et al. | 455/127 |
| 5,778,312 | * 7/1998 | Kawashima | 455/574 |
| 5,799,256 | * 8/1998 | Pombo et al. | 455/574 |
| 5,845,190 | * 12/1998 | Bushue et al. | 455/3.3 |
| 5,864,221 | * 11/1999 | Downs et al. | 320/134 |
| 5,994,844 | * 11/1999 | Crawford et al. | 315/151 |
| 5,994,855 | * 11/1999 | Lundell et al. | 318/114 |

FOREIGN PATENT DOCUMENTS

| | | | |
|---|---|---|---|
| 58-103238 | * 6/1983 | (JP) | H04B/1/16 |
| 59-12055 | 3/1984 | (JP) . | |
| 62-160830 | 7/1987 | (JP) . | |
| 63-316942 | 12/1988 | (JP) . | |
| 1-77223 | 7/1989 | (JP) . | |
| 4-211529 | 8/1992 | (JP) . | |
| 4-251370 | 9/1992 | (JP) . | |
| 4-273695 | 9/1992 | (JP) . | |
| 4-304043 | 10/1992 | (JP) . | |
| 4-304721 | * 10/1992 | (JP) | H04B/7/26 |
| 4-345330 | 12/1992 | (JP) . | |

OTHER PUBLICATIONS

Joint Technical Committee (Air) pp.68–75 (1995).

* cited by examiner

*Primary Examiner*—Nguyen T. Vo
*Assistant Examiner*—Eliseo Ramos-Feliciano
(74) *Attorney, Agent, or Firm*—Foley & Lardner

(57) ABSTRACT

A radio terminal apparatus is arranged by a signal receiving circuit for receiving an externally supplied signal; a power supply for supplying electric power to each of circuit portions of the radio terminal apparatus; judging means for judging a reception signal field strength of the received external signal; and a power supply control unit for intermittently supplying the electric power derived from the power supply to the signal receiving circuit, while changing a power supplying period in response to the reception signal field strength judged by the judging means under call waiting state of the radio terminal apparatus. Further, a mobile communication system is arranged by these radio terminal apparatus, radio base station control apparatus, and radio base station apparatus.

3 Claims, 15 Drawing Sheets

RADIO TERMINAL APPARATUS

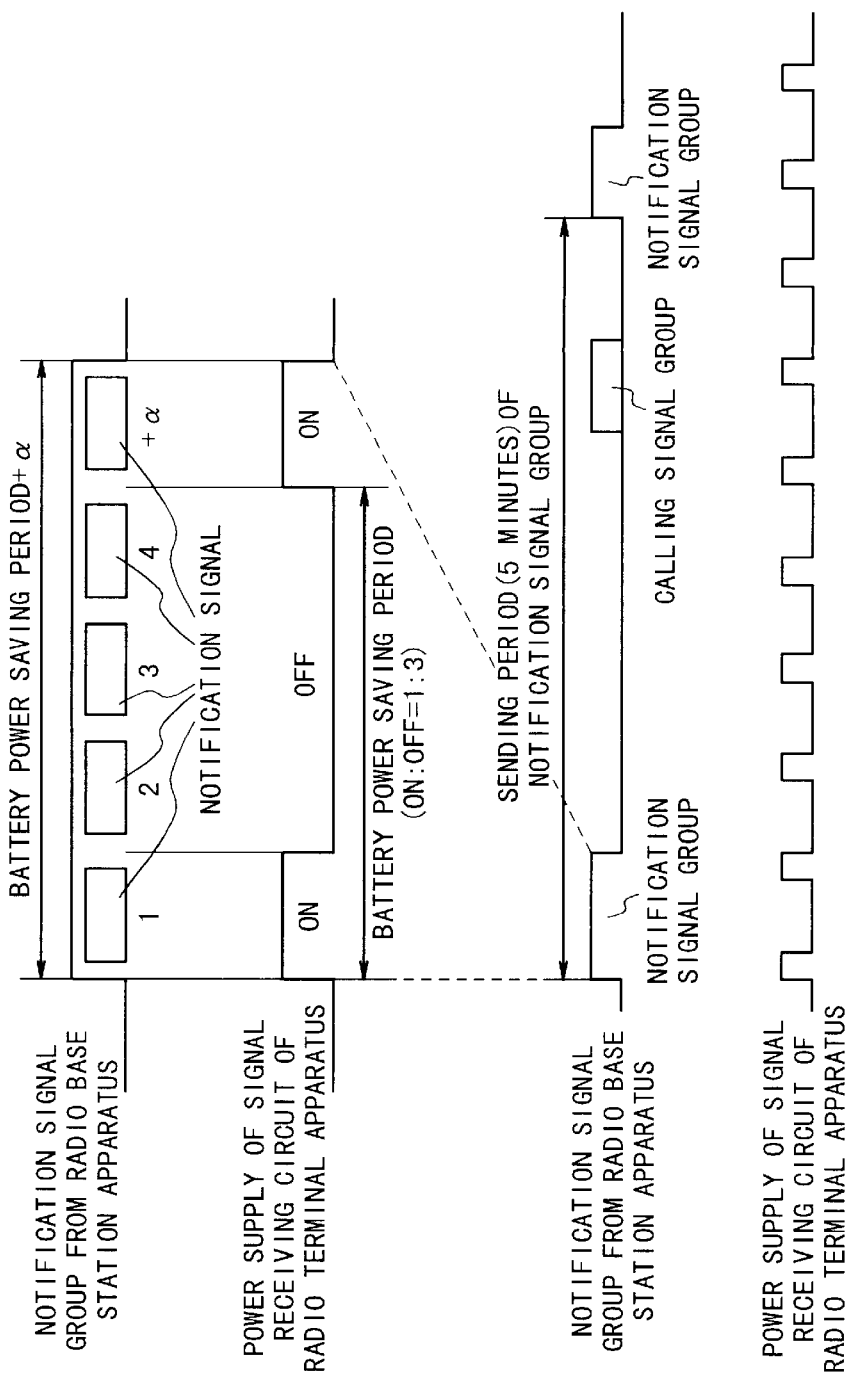

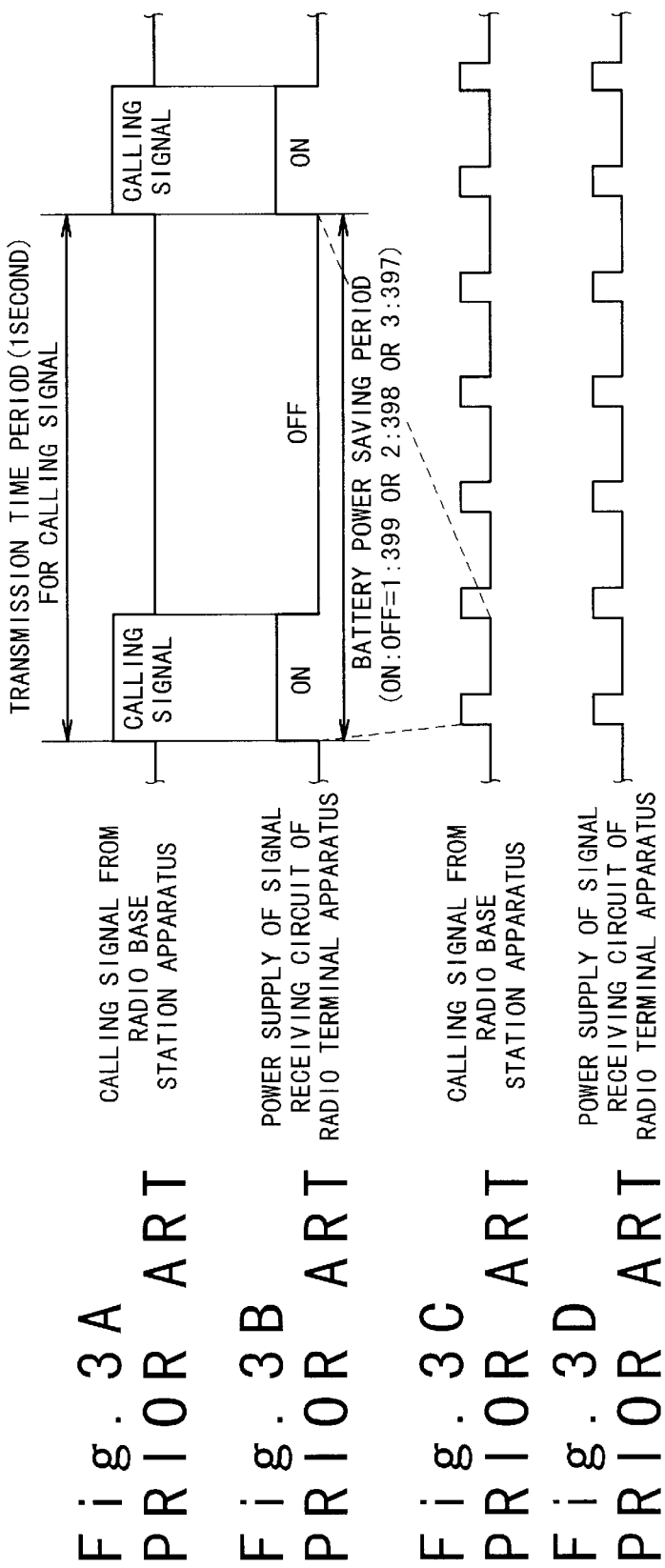

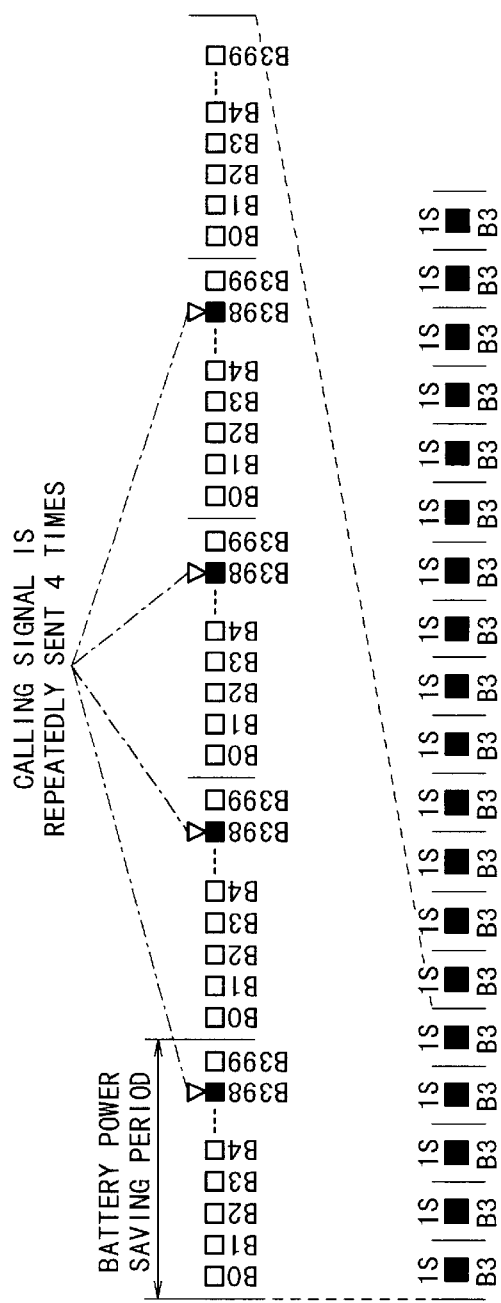

RADIO TERMINAL APPARATUS

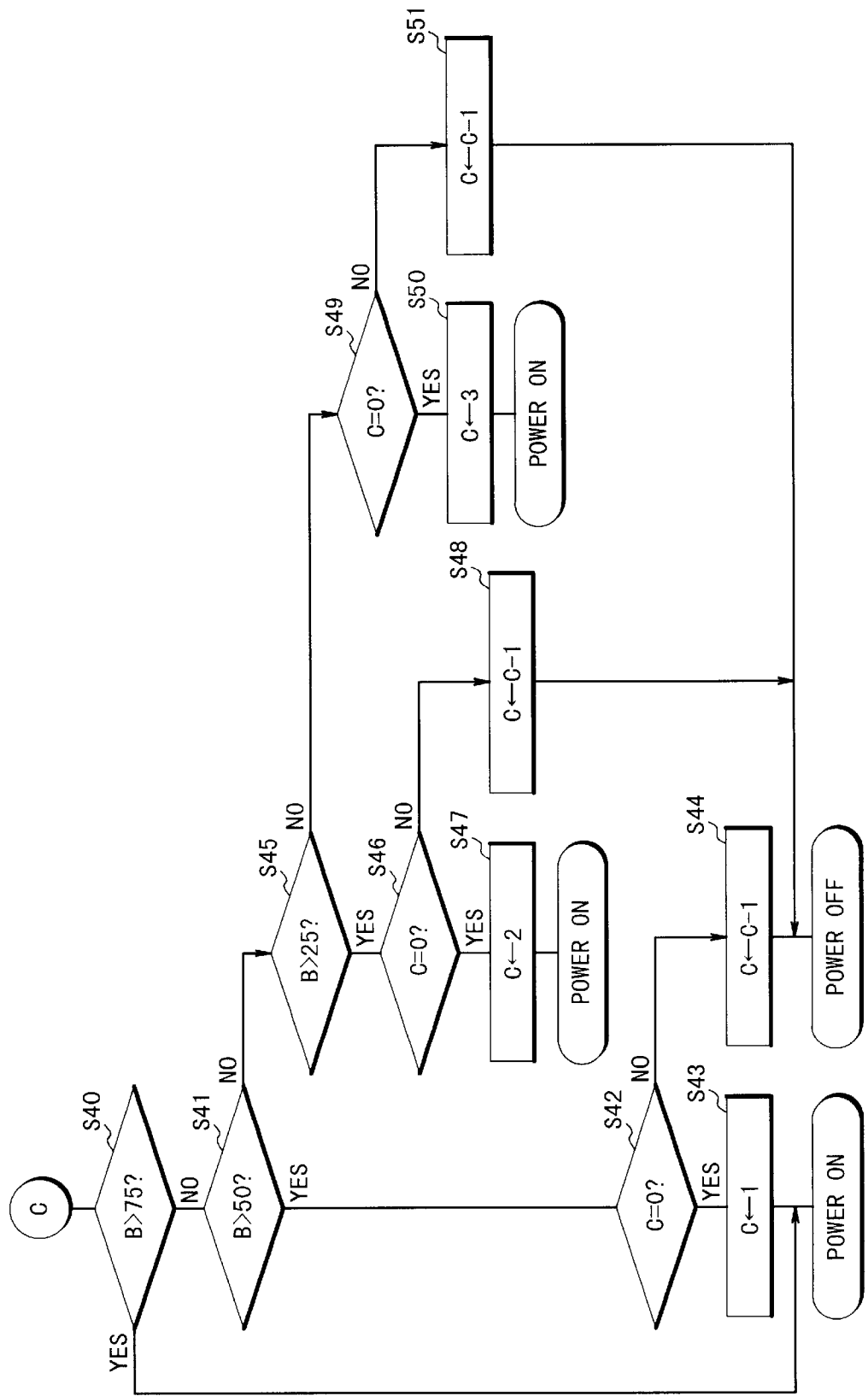

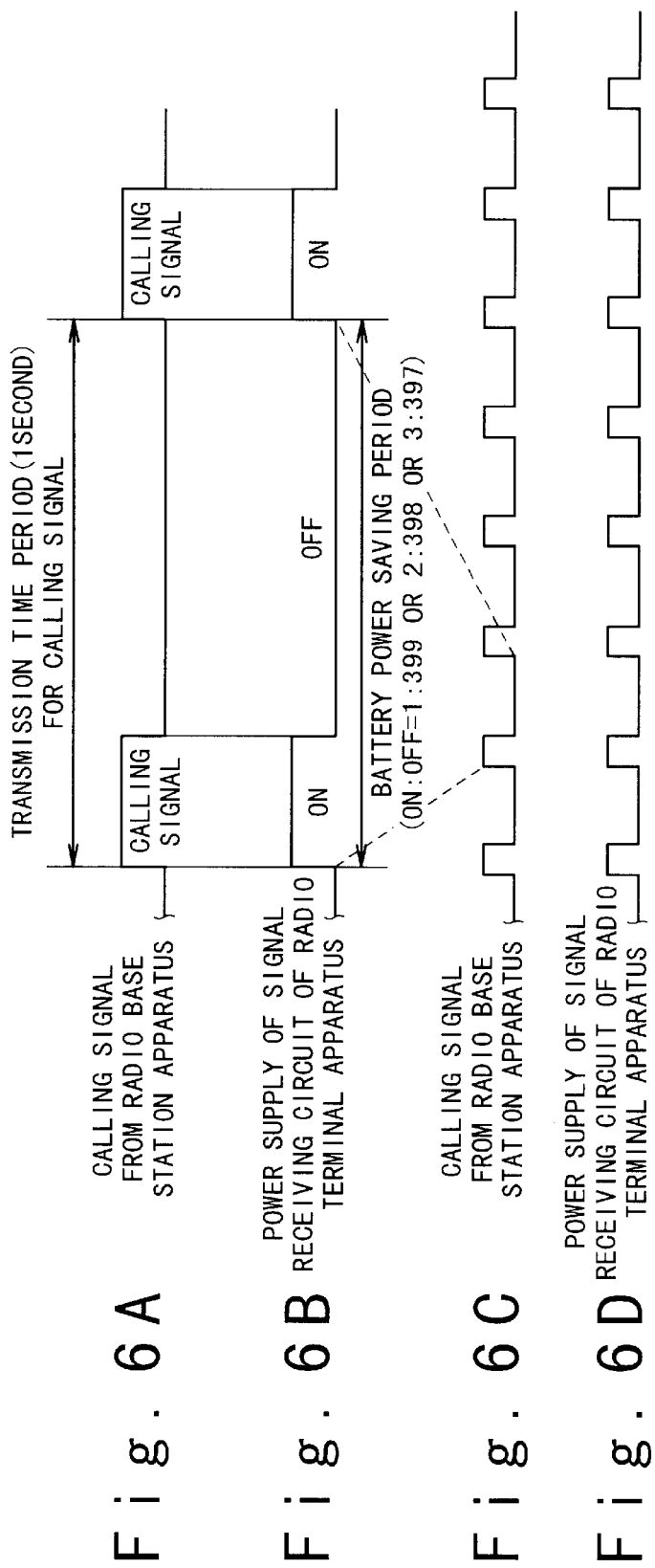

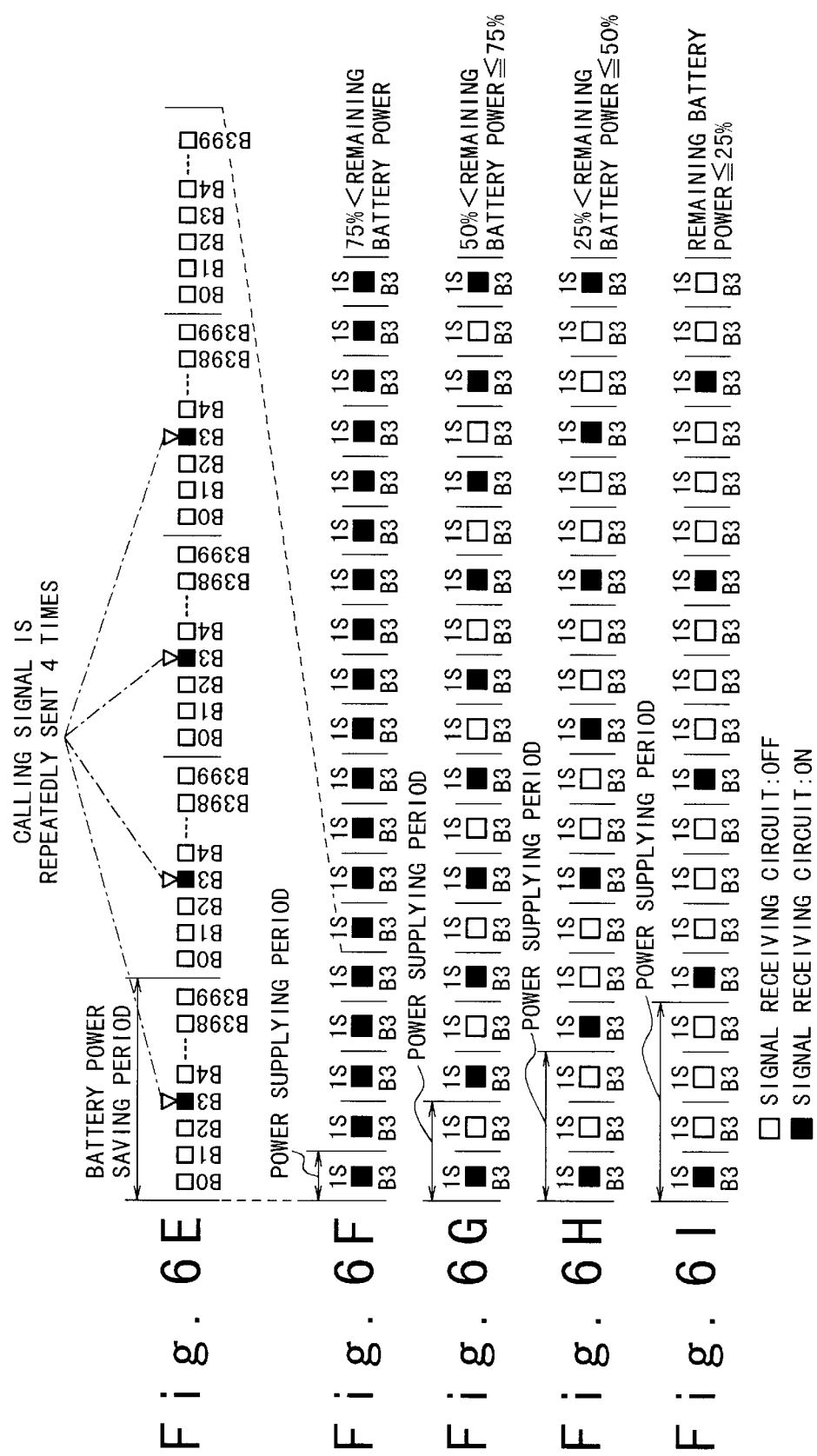

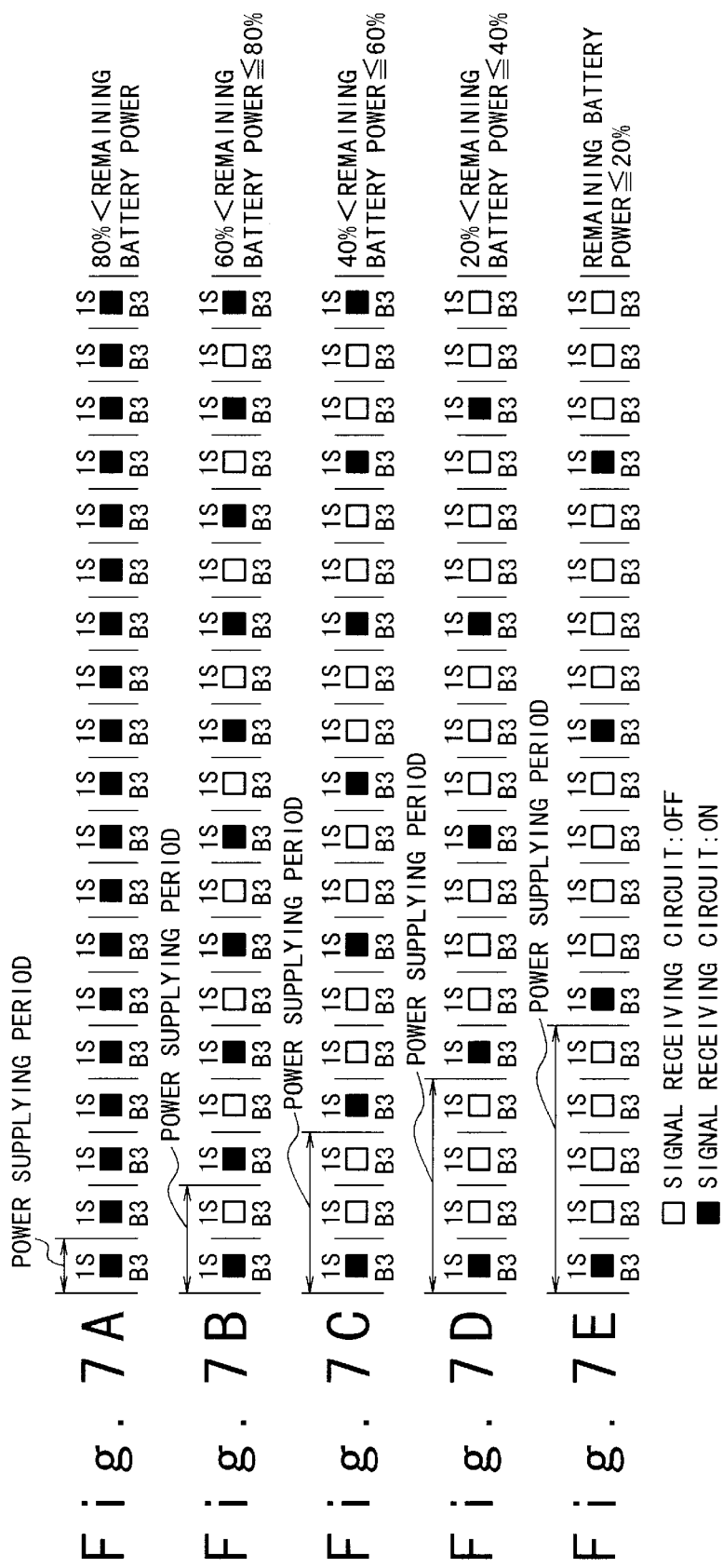

RADIO TERMINAL APPARATUS EQUIPPED WITH BATTERY POWER SAVING FUNCTION, AND MOBILE COMMUNICATION SYSTEM USING THE SAME

BACKGROUND OF THE INVENTION

1. Field of the Invention

The present invention generally relates to a radio (wireless) terminal apparatus such as a mobile vehicle telephone and a portable telephone, and a mobile communication system such as a mobile (vehicle) telephone system and a portable telephone system with employment of this radio terminal apparatus. More specifically, the present invention is directed to battery power saving techniques under call waiting states of radio terminal apparatuses for constituting this sort of mobile communication system.

2. Description of the Related Art

In general, a radio (wireless) terminal apparatus for constructing a mobile communication system performs a location registering operation when a power supply is turned ON, and thereafter operation of this radio terminal apparatus is brought into a call waiting state. Then, under this call waiting state, a battery power saving operation is carried out.

As such a conventional radio terminal apparatus, for instance, Japanese Laid-open Patent Disclosure JP-A-Showa 63-316942 opened in 1988 discloses "RADIO TELEPHONE APPARATUS". It should be noted that the disclosed radio telephone apparatus will be referred as "first conventional technique" hereinafter in this specification. Referring now to FIG. 1A, FIG. 1B and FIG. 2A to FIG. 2D, a description will now be made of this radio terminal apparatus related to the first conventional technique.

FIG. 1A schematically represents the arrangement of the mobile communication system according to the first conventional technique. This mobile communication system is arranged by a radio (wireless) base station control apparatus, a plurality of radio base station apparatuses, and a plurality of radio (wireless) terminal apparatuses. FIG. 1B is a block diagram for showing the arrangement of the radio terminal apparatus for constituting this conventional mobile communication system. This radio terminal apparatus is arranged by a radio (wireless) signal transmitting/receiving unit 1, a speaker 2, a microphone 3, an input/output apparatus 4, a control unit 5, a memory unit 6, and an antenna 9. A detailed description of each of these elements will be explained in connection with a preferred embodiment.

FIG. 2A to FIG. 2D are explanatory diagrams for explaining the summary of battery power saving operation executed in the radio terminal apparatus of the first conventional technique. More specifically, FIG. 2A is a timing chart for representing a notification signal group transmitted from the radio base station control apparatus via the radio base station. FIG. 2B is a timing chart for showing an ON/OFF condition of the power supply supplied to the radio signal transmitting/receiving unit 1 (simply referred to as a "signal receiving circuit") of the radio terminal apparatus. FIG. 2C is another timing chart for showing the above-described notification signal group, in which the scale of the abscissa in FIG. 2A is reduced. FIG. 2D is another timing chart for representing the above-described ON/OFF condition, in which the scale of the abscissa in FIG. 2B is reduced at the same reduction ratio of FIG. 2C.

Under call waiting state of the radio terminal apparatus, the turn-ON/OFF operation of the power supply of the signal receiving circuit is controlled in a predetermined time period (this time period is referred as the "battery power saving period"). As shown in FIG. 2B, within 1 battery power saving period, the power supply of the signal receiving circuit is turned ON in a ¼ section of 1 time period, whereas this power supply is turned OFF in a ¾ section of 1 time period. In other words, a ratio of the turn ON/OFF of the power supply of the signal receiving circuit is 1:3. Then, while the power supply of the signal receiving circuit is turned ON, a confirmation is made as to whether or not the call signal to the own radio terminal apparatus is produced. This call signal contains the notification signal and the calling signal (will be explained later).

As shown in FIG. 2C, the radio base station control apparatus transmits the notification signal group to the radio terminal apparatus via the radio base station apparatus, for instance, at an interval of 5 minutes in order to register the location. This notification signal group is constituted by a plurality of notification signals identical to each other, and these notification signals are transmitted in the asynchronous mode within the above-described battery power saving period. Also, a total number of notification signals contained in the notification signal group is determined in order that the transmission time of the notification signal group becomes longer than the battery power saving period. Such a notification signal overflowed from the battery power saving period is called as a "notification signal of +aα". As represented in FIG. 2A, in this first conventional technique, 4 pieces of the notification signals are transmitted within 1 battery power saving period, and further one piece of the notification signal is transmitted as the "notification signal of +α". In other words, the radio base station control apparatus transmits 5 pieces of the continuous notification signals via the radio base station apparatus in the interval of 5 minutes.

As indicated in FIG. 2B, in the radio terminal apparatus, the power supply of the signal receiving circuit is turned ON under control of the control unit in the ¼ section of the battery power saving period. As previously explained, the timing when this power supply is turned ON is not synchronized with the notification signal sent from the radio base station control apparatus via the radio base station apparatus.

It should be understood that when a call is issued to the radio terminal apparatus managed by the radio base station control apparatus, this radio base station control apparatus transmits the calling signal group via the radio base station apparatus irrelevant to the above-described transmission timing of the notification signal group, as shown in FIG. 2C. Similar to the above-described notification signal group, this calling signal group is constructed of 5 pieces of continuous calling signals (not shown).

The reason why either the same notification signals or the same calling signals are continuously transmitted 5 times in this first conventional technique is given as follows. That is, the power supply of the signal receiving circuit is turned ON only in the ¼ section of the battery power saving period and further the battery power saving period is not synchronized with the send timing of either the notification signal group or the calling signal group. Thus, in order to firmly receive either the notification signal or the calling signal while the power supply of the signal receiving circuit is turned ON, either one piece of the notification signal or one piece of the calling signal is outputted in addition to either four pieces of the notification signals or four pieces of the calling signals, which correspond to the battery power saving period.

The battery power saving ratio is 75% in the case that the radio terminal apparatus of the first conventional technique is operated under call waiting state. Assuming now that the ON/OFF ratio of the power supply of the signal receiving circuit is 1:4, the battery power saving ratio is increased to 80% when this radio terminal apparatus is operated under call waiting state. However, in this case, either the same notification signals or the same calling signals are required to be continuously transmitted 6 times, so that the load given to the radio base station control apparatus is increased.

Another conventional radio terminal apparatus is disclosed in "JTC (AIR)/95.06.08-033R3 [SP-3418]", section 6.4.1 "Alerting Protocol" on pages 69–74. This disclosed convention radio terminal apparatus is called as "second conventional technique".

FIG. 3A to FIG. 3F are explanatory diagrams for explaining the summary of battery power saving operation executed in the radio terminal apparatus of the second conventional technique. More specifically, FIG. 3A is a timing chart for representing the calling signal transmitted from the radio base station control apparatus via the radio base station, and FIG. 3B is a timing chart for showing the ON/OFF condition of the power supply of the signal receiving circuit of the radio terminal apparatus. FIG. 3C is another timing chart for showing the above-described calling signal, in which the scale of the abscissa in FIG. 3A is reduced. FIG. 3D is another timing chart for representing the above-described ON/OFF condition, in which the scale of the abscissa in FIG. 3B is reduced at the same reduction ratio of FIG. 3C.

The circuit arrangement of the mobile communication system and the circuit arrangement of the radio terminal apparatus contained in this mobile communication system, according to this second conventional technique, are identical to those of the first conventional technique shown in FIG. 1A and FIG. 1B. As represented in FIG. 3A and FIG. 3C, the calling signal is transmitted from the radio base station control apparatus via the radio base station apparatus in 1 second time period. FIG. 3E shows a frame structure of the calling signal within the 1-second time period. As apparent from FIG. 3E, this signal transmitting period is constructed of 400 frames (BOB-399). When the location registering operation is performed, an operation of the radio terminal apparatus is synchronized with that of the radio base station control apparatus (radio base station apparatus), and the block used to transmit the calling signal is allocated. The radio base station control apparatus transmits the calling signal at the timing of the block allocated to the radio terminal apparatus during the location registering operation by using 1 frame through 3 frames every 1 second via the radio base station apparatus. For the sake of simple explanations, it is assumed that the calling signal is transmitted every 1 second by using 1 frame.

Even when no calling signal is received at such a radio terminal apparatus corresponding to a certain block, the radio base station control apparatus sends out the dummy data to this radio terminal apparatus by using 1 frame. In the case that a call signal is received at a certain radio terminal apparatus, the radio base station control apparatus continuously transmits the call signal via the radio base station apparatus at the timing of the block allocated to this radio terminal apparatus only the number of times of transmission (2 times to 5 times) which are determined as the system information.

As a result, assuming now that when a location of a certain radio terminal apparatus is registered, for example, a block 3 (B3) is allocated as a calling block, the power supply of the signal receiving circuit is turned ON at the timing of the block 3 only one time per 1 second during 1/400 second (minimum) to 3/400 seconds (maximum) under control of the control unit 5 in the radio terminal apparatus. FIG. 3F represents such a condition that the power supply of the signal receiving circuit is turned ON at the timing of the block B3 within the respective sending period (1 second).

In such a case that the predetermined number of times of transmission is equal to, for example, 4 times, when a calling signal is received by such a radio terminal apparatus allocated to the block 398 (B398), as indicated in FIG. 3E, a calling signal for calling this radio terminal apparatus is continuously sent 4 times every 1 second at the timing of the block B398 by the radio base station control apparatus.

The battery power saving ratio when the radio terminal apparatus of this second conventional technique is operated under call waiting state becomes 99.25% (=(400-3)/400) in such a case that, for example, the calling signal is sent out by using three frames.

There is a great difference between the first conventional technique and the second conventional technique. That is, in the first conventional technique, the calling period of the radio base station control apparatus is not synchronized with the time period during which the power supply of the signal receiving circuit employed in the radio terminal apparatus is turned ON, but is synchronized with the time period in the second conventional technique. As a consequence, in the response waiting process operation for the calling operation, the calling signal is resent when the time out of the timer set to a predetermined value is occurred in the first conventional technique, whereas the calling signal is continuously transmitted irrelevant to the response in the second conventional technique.

A first problem occurred in such conventional technique, the duration time of the battery employed in the radio terminal apparatus is short. This first problem is caused by such a fact that the power of this battery is consumed even when the radio terminal apparatus is operated under call waiting state. In a certain condition, the user of this radio terminal apparatus cannot recharge this battery for a long term.

In such a case, when the remaining power quantity of this battery becomes zero while the user continues the telephone communication, this telephone communication is interrupted.

A second problem of the conventional technique is caused by such a fact that there are great possibilities that the calling signal cannot be surely received. That is, when the reception signal field strength of the control channel is low (weak), if only one calling signal is sent, then there are high possibilities that the reception of this calling signal fails because of the fading phenomenon.

Furthermore, Japanese Laid-open Patent Disclosure JP-A-Heisei 4-273695 discloses "MOBILE COMMUNICATION APPARATUS" as the related art. In this mobile communication apparatus, the location registering operation of the changed radio base station is carried out only when the location registering demand transmitted from the radio mobile station in a predetermined time period is received by the respective radio base stations, and the reception signal field strength of this demand signal can be detected as such a highest reception signal field level continuously received preselected times. However, in this conventional mobile communication apparatus, the power supply of the signal receiving circuit is not turned ON/OFF in response to the reception signal field strength level.

Also, Japanese Laid-open Patent Disclosure JPA-Heisei 1-177223 opened in 1990 discloses "MOBILE RADIO COMMUNICATION APPARATUS". This mobile radio communication apparatus is applied to the radio communication system arranged by that a plurality of base stations are arranged at random; the channels are allocated to the respective base stations whose channels are different from those of the adjacent base stations; the mobile radio communication apparatus owns the transmitting/receiving means for the respective channels; and then the radio communications are established with the base stations within the service areas of the respective base stations by using the channels allocated to the relevant base station. This mobile radio communication apparatus is arranged by the field strength measuring reception means, the comparing means, and the control means. The field strength measuring reception means sequentially receives the channel signals outputted from the respective base stations to thereby acquire the field strength measurement output. The comparing means compares the measurement output from this field strength measuring reception means with the field strength output of the reception signal derived from the above-described signal transmitting/receiving means, and produces the switching output when the measurement output of the field strength measuring reception means exceeds the field strength output of the reception signal of the signal transmitting/receiving means. The control means continuously outputs the measuring channel switching command used to sequentially switch the reception channels of the field strength measuring reception means, and switches the transmission/reception channel of the signal transmitting/receiving means to such a reception channel of the field strength measuring reception means upon receipt of the switching output from the comparing means. In accordance with the conventional mobile communication apparatus, this mobile communication apparatus can continuously access to such a base station where the reception signal field strength is the highest level. However, in this mobile communication apparatus, the power supply of the signal receiving circuit is not turned ON/OFF in response to the reception signal field strength level.

Further, Japanese Laid-open Patent Disclosure JP-A-Heisei 4-251370 opened in 1992 discloses "POWER SUPPLY FOR PORTABLE TYPE INPUT/OUTPUT APPARATUS". This power supply for the portable type input/output apparatus is arranged by the secondary battery corresponding to the power source; the charge/discharge detecting unit for discriminating the charge operation from the discharge operation based on the current flowing direction of the secondary battery to transmit the discrimination data; and the A/D converting unit for measuring the charge voltage and the discharge voltage of the secondary battery to A/D-convert these measured voltages into the corresponding digital data. Further, this power supply is constituted by the RAM for temporarily storing the digital data derived from the A/D converting unit; the ROM for previously storing the control software; the CPU for executing the data process operations based on the digital data stored into the RAM and also the data derived from the charge/discharge detecting unit under control of the control software stored in this ROM; the display unit for displaying the remaining battery power quantity and the battery lifetime based on the data process result of the CPU; and the connection unit for connecting the main body of the portable type input/output apparatus so as to supply the electric power of the secondary battery. However, this conventional portable type input/output apparatus power supply does not execute the battery power saving operation in response to the remaining power quantity of the secondary battery, but merely displays the remaining electric power of the secondary battery.

Also, Japanese Laid-open Patent Disclosure JP-A-Showa 58-103238 opened in 1983 discloses "RADIO APPARATUS". This conventional radio apparatus is arranged by the transmitter and the receiver having the power supply control unit. The transmitter transmits the calling signal during a preselected time period after the calling switch is turned ON. The receiver is intermittently operated only within a short time period in such a time period shorter than the above-described preset time period, and the electric power is supplied to the demodulating circuit unit having the relatively slow response characteristic in response to the power application within this short time period. Thereafter, the electric power is applied to the other circuit units such as the low frequency amplifier having the quick response characteristic. This radio apparatus further includes the power supply voltage detecting circuit for detecting the power supply voltage, and the receiver with such a power supply control unit having the following functions. That is, when the power supply voltage detected by this power supply voltage detecting circuit is low, the start timing of the power supply voltage is advanced. Conversely, when the detected power supply voltage is high, the start timing of the power supply voltage is delayed so as to vary the power supplying period for the demodulating circuit unit. As previously explained, this conventional radio apparatus controls the start timing of the power supply voltage to the demodulating circuit unit so as to vary the power supplying period. In contrast, a radio terminal apparatus (will be explained later) according to the present invention owns such a different technical idea. That is, the time duration during which the power supply voltage is applied is varied by changing the power supplying period.

Also, Japanese Laid-open Patent Disclosure JP-A-Heisei 4-345330 opened in 1992 discloses "MOBILE RADIO APPARATUS". This mobile radio apparatus employs the means for intermittently operating the signal reception system when the call is received, the means for controlling the time period of this intermittent reception operation, and the means for detecting the field strength during the intermittent signal reception. Then, when the detected field strength is low, the time period of the intermittent signal reception operation is prolonged to reduce the power consumption. To the contrary, in the radio terminal apparatus according to the present invention, when the detected field strength is low, the time period of the interrupted signal reception operation is shortened so as to surely receive the calling signal.

Also, Japanese Patent Publication JP-B-Showa 59-12055 published in 1984 discloses "MOBILE COMMUNICATION SYSTEM". In this mobile communication system, the paging call sent via the saving control channel from the base station is received/detected by the calling signal receiving circuit to which the electric power is supplied from the power supply in a predetermined time period, and the electric power of the power supply is supplied from the telephone battery saving circuit to the telephone transmitting/receiving circuit in response to this paging call reception, or the on-hook operation of the transmitting/receiving device. The designation information of the communication channel sent from the base station via the connection channel is received/discriminated to set the communication channel. However, this conventional mobile communication system does not describe the battery power saving technique in response to the remaining power quantity of the power supply.

Also, Japanese Laid-open Patent Disclosure J-PA-Showa 62-160830 opened in 1987 discloses "SELECTIVE CALLING SIGNAL RECEIVER". This selective calling signal receiver is arranged by that in the radio receiver having the battery power saving circuit, for receiving/processing the selective calling signal, the synchronization monitoring means is employed which includes the detecting means for detecting the error of the selective calling code contained in the selective calling signal, and the control means for controlling the battery power saving circuit in response to the error detection signal derived from this error detecting means. However, in this conventional selective calling signal receiver, such a power saving operation cannot be carried out in response to the remaining power quantity of the power supply as executed in the inventive radio terminal apparatus.

Further, Japanese Laid-open Patent Disclosure JP-A-Heisei 4-211529 discloses "BATTERY POWER SAVING METHOD OF PAGING SYSTEM". This conventional battery power saving method of the paging system is featured by that in the paging system using the paging signal for sending the sync code and the calling signal subsequent to the preamble signal, there are employed the first battery power saving means for executing the battery power saving operation in the short time period until the first preamble signal is detected, and the second battery power saving means for turning OFF the power supply under such a condition that when the preamble signal is once detected and the subsequent sync signal is detected, from the end of the calling signal until this preamble signal of the paging signal is detected, namely from the end of this paging signal, this power supply is turned OFF. However, this conventional battery power saving method of the paging system cannot carry out such a battery power saving operation in response to the remaining battery power quantity as executed in the inventive radio terminal apparatus.

Furthermore, Japanese Laid-open Patent Disclosure JP-A-Heisei 4-304043 opened in 1992 discloses "RADIO SELECTIVE CALLING RECEIVER". This conventional radio selective calling receiver is equipped with the radio signal unit, the decoding unit, the calling signal detecting unit, and the notifying unit. Further, the zone detecting unit and the power supply control unit are employed. This zone detecting unit detects whether the present location of the receiver is located within the signal receivable zone, or outside the signal receivable zone in response to the individual calling signal. In the power supply control unit, the first time interval and the second time interval longer than this first time interval are set, and the intermittent power supplying operation of the power supply unit 6 is selected as the first time interval or the second time interval in response to the output from the zone detecting unit. However, this conventional radio selective calling receiver cannot perform such a battery power saving operation in response to the remaining power quantity of the power supply as executed in the inventive radio terminal apparatus.

SUMMARY OF THE INVENTION

An object of the present invention is to provide such a radio terminal apparatus, and also a mobile communication system with employment of this radio terminal apparatus capable of prolonging a lifetime of a battery used in this radio terminal apparatus. That is to say, battery power used in a call waiting state is decreased from the total battery power consumption, and at the same time, battery power used to transmit/receive communication signals can be increased.

A further object of the present invention is to provide such a radio terminal apparatus and a mobile communication system with employment of this radio terminal apparatus capable of reducing battery power used in the call waiting condition while a calling signal can be surely received.

To achieve the above-described objects, a radio terminal apparatus, according to an aspect of the present invention, comprising:
  a signal receiving circuit for receiving an externally supplied signal;
  a power supply for supplying electric power to each of circuit portions of the radio terminal apparatus;
  a signal receiving circuit for receiving an externally supplied signal;
  a power supply for supplying electric power;
  a remaining power detecting unit for detecting a remaining power quantity of the power supply; and
  a power supply control unit for selectively supplying the electric power from the power supply to the signal receiving circuit for a predetermined frame in units of power supplying periods based on the remaining power quantity detected by the remaining power detecting unit.

Similarly, to achieve the objects, a mobile communication system, according to another aspect of the present invention, comprising:
  a radio base station control apparatus for controlling an entire system of the mobile communication system;
  a radio base station apparatus connected to the radio base station control apparatus; and
  a radio terminal apparatus for transmitting/receiving a radio signal to/from the radio base station apparatus,
  wherein the radio terminal apparatus includes:
    a signal receiving circuit for receiving an externally supplied signal;
    a power supply for supplying electric power;
    a remaining power detecting unit for detecting remaining power quantity of the power supply; and
    a power supply control unit for selectively supplying the electric power from the power supply to the signal receiving circuit for a predetermined frame in units of power supplying periods based on the remaining power quantity detected by the remaining power detecting unit.

Also, to achieve the objects, a radio terminal apparatus, according to another aspect of the present invention, comprising:
  a signal receiving circuit for receiving an externally supplied signal;
  a power supply for supplying electric power;
  a judging section for judging a reception signal field strength based on the externally supplied signal; and
  a power supply control unit for selectively supplying the electric power from the power supply to the signal receiving circuit for a predetermined frame in units of power supplying periods based on the reception signal field strength judged by the judging section.

Moreover, to achieve the objects, a mobile communication system, according to another aspect of the present invention, comprising:
  a radio base station control apparatus for controlling an entire system of the mobile communication system;
  a radio base station apparatus connected to the radio base station control apparatus; and
  a radio terminal apparatus for transmitting/receiving a radio signal to/from the radio base station apparatus,
  wherein the radio terminal apparatus includes:

a signal receiving circuit for receiving an externally supplied signal;

a power supply for supplying electric power;

a judging section for judging a reception signal field strength based on the externally supplied signal; and a power supply control unit for selectively supplying the electric power from the power supply to the signal receiving circuit for a predetermined frame in units of power supplying periods based on the reception signal field strength judged by the judging section.

BRIEF DESCRIPTION OF THE DRAWINGS

For a better understanding of the present invention, reference is made of a detailed description to be read in conjunction with the accompanying drawings, in which:

FIG. 2A to FIG. 2D are explanatory diagrams for explaining a basic idea of the battery power saving technique employed in the radio terminal apparatus of the first conventional technique;

FIG. 3A to FIG. 3F are explanatory diagrams for explaining a basic idea of the battery power saving technique employed in the radio terminal apparatus of the second conventional technique;

FIG. 5A to FIG. 5E are flow charts for describing operations of a power supply control unit employed in the radio terminal apparatus according to the embodiment 1 of the present invention;

FIG. 6A to FIG. 6I show timing charts for explaining operations in the case of Np=4 in the embodiment 1 of the present invention;

FIG. 7A to FIG. 7E show timing charts for explaining operations in the case of Np=5 in the embodiment 1 of the present invention;

DESCRIPTION OF THE PREFERRED EMBODIMENTS

Referring now to drawings, various preferred embodiments of the present invention will be described in detail.

EMBODIMENT 1

Figure 1A:
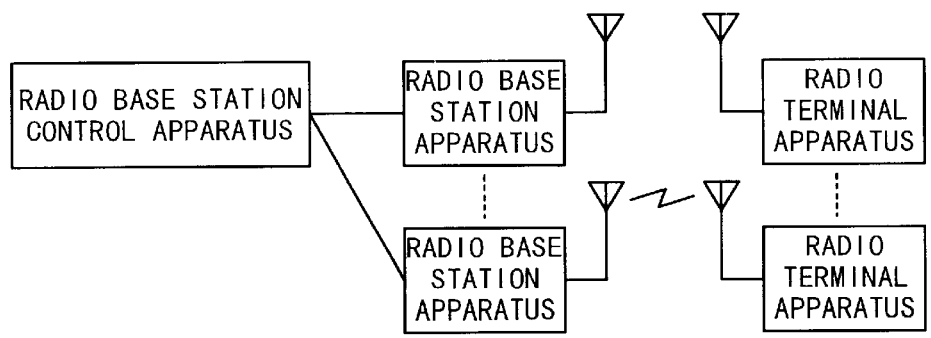
FIG. 1A schematically shows the arrangement of the mobile communication system belonging to the first conventional technique.
Figure 1B:
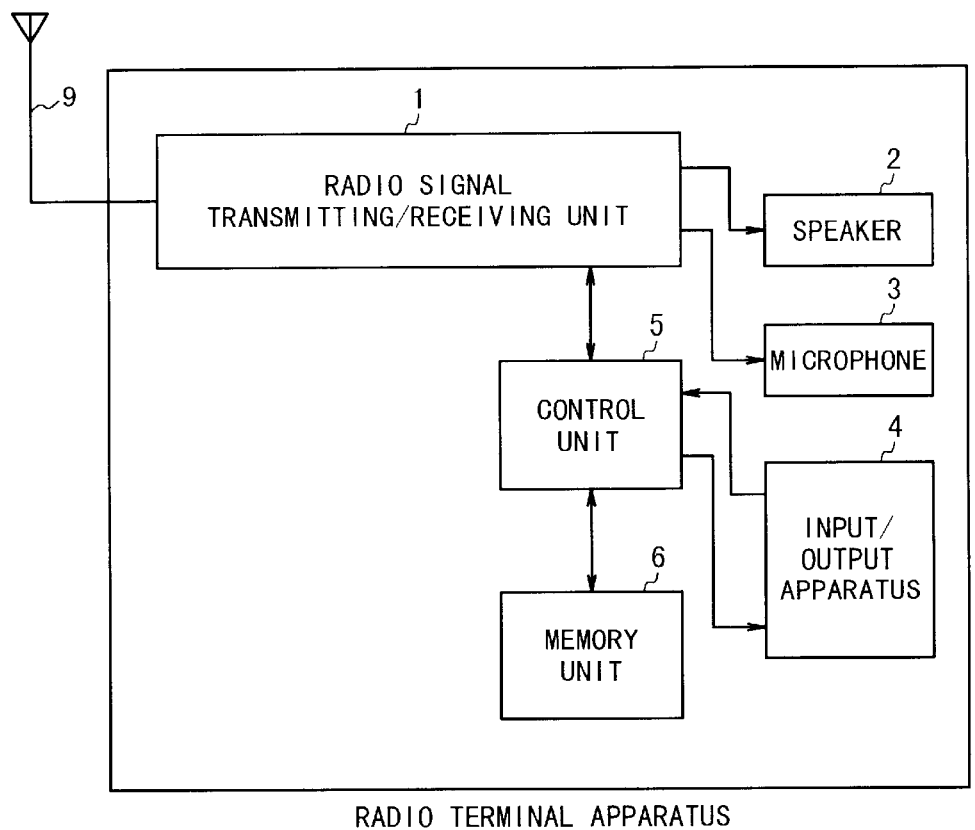
FIG. 1B is a schematic block diagram for indicating the arrangement of the radio terminal apparatus which constitutes the mobile communication system indicated in FIG. 1A.
Figure 4A:
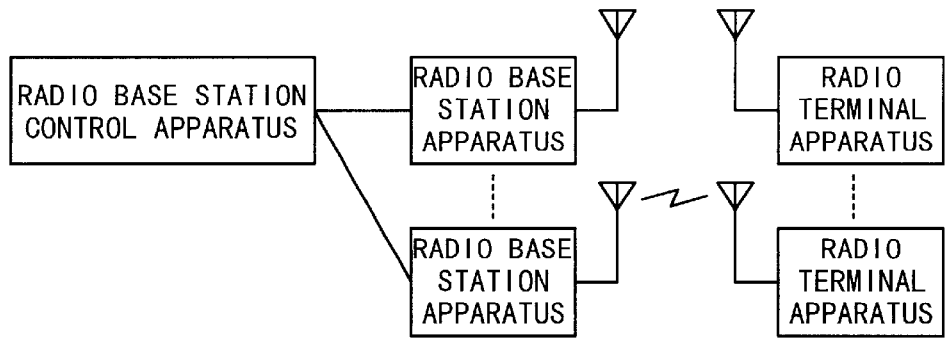
FIG. 4A schematically represents an arrangement of a mobile communication system according to an embodiment 1 and an embodiment 2 of the present invention.

FIG. 4A schematically represents an arrangement of a mobile communication system according to an embodiment 1 of the present invention. This mobile communication system is arranged by a radio (wireless) base station control apparatus, a plurality of radio base station apparatuses, and a plurality of radio (wireless) terminal apparatuses. As shown in FIG. 4A, a plurality of radio base station apparatuses are connected to the radio base station control apparatus, and a plurality of radio terminal apparatuses are controlled via these radio base station apparatuses by this radio base station control apparatus. The radio base station control apparatus sends out the number of times of continuous reception of the call signal determined as the system information by using a control channel.

The radio terminal apparatus owns such a function that under call waiting state, this radio terminal apparatus turns ON a receiving circuit in a time period (1 second) predetermined every radio terminal apparatus so as to confirm whether or not a call signal to the own apparatus is present. When a call is issued to such a radio terminal apparatus controlled by the radio base station control apparatus, this radio base station control apparatus continuously transmits a call signal plural times determined as the system information at timing of a block which is determined to the relevant radio terminal apparatus via the radio base station apparatus.

Figure 4B:
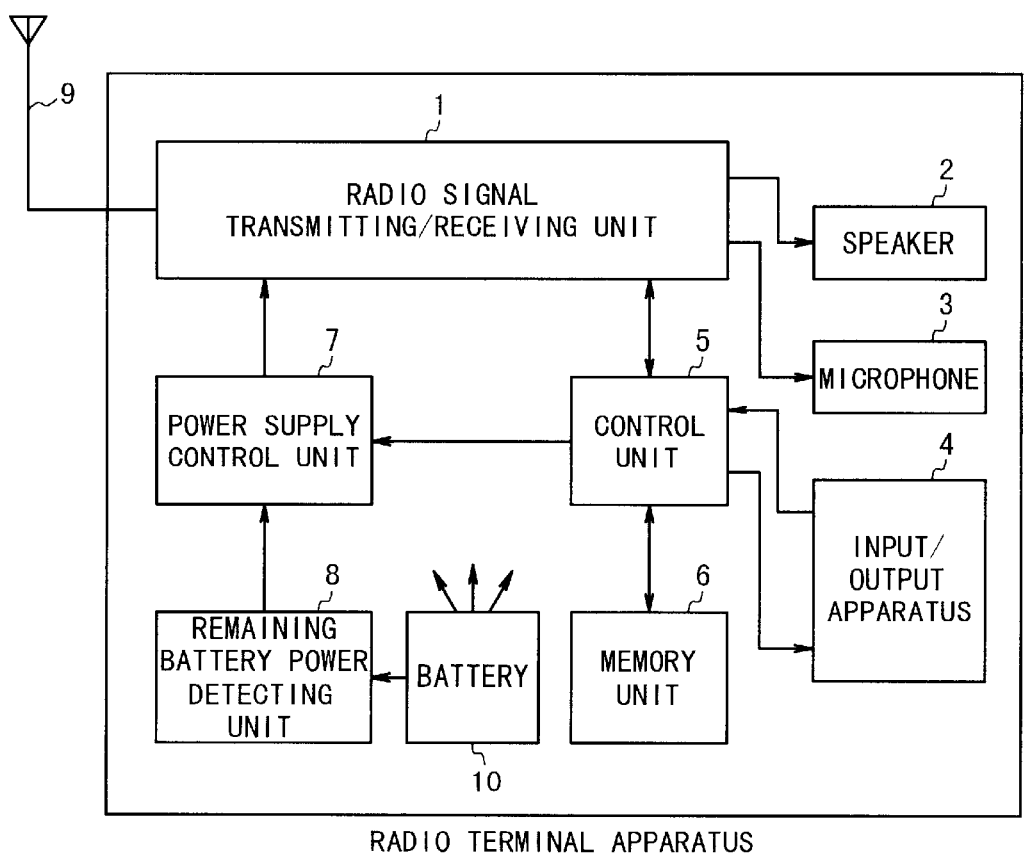
FIG. 4B is a schematic block diagram for indicating an arrangement of a radio terminal apparatus which constitutes the mobile communication system indicated in FIG. 4A.

FIG. 4B is a schematic block diagram for indicating an internal arrangement of a radio terminal apparatus used in the above-described mobile communication system of FIG. 4A. This radio terminal apparatus is arranged by a radio (wireless) signal transmitting/receiving unit 1, a speaker 2, a microphone 3, an input/output apparatus 4, a control unit 5, a memory unit 6, a power supply control unit 7, a remaining battery power detecting unit 8, an antenna 9, and a battery 10.

The antenna 9 receives electromagnetic waves transmitted from the radio base station apparatus, and then converts the electromagnetic waves into electric signals. The electric signals obtained from this antenna 9 are supplied to the radio signal transmitting/receiving unit 1. Also, the antenna 9 converts electric signals supplied from the radio signal transmitting/receiving unit 1 into electromagnetic waves and emits the electromagnetic waves to the air. The radio signal transmitting/receiving unit 1 demodulates an electric signal derived from the antenna 9 so as to acquire a voice signal and a control signal from this demodulated signal. The acquired voice signal is supplied to the speaker 2, and the acquired control signal is supplied to the control unit 5. Also, the radio signal transmitting/receiving unit 1 modulates a control signal supplied from the control unit 5 and a voice signal supplied from the microphone 3, and then supplies the modulated signal to the antenna 9.

The speaker 2 converts the voice signal derived from the radio signal transmitting/receiving unit 1 into voice. On the other hand, the microphone 3 converts voice into a voice signal and supplies this voice signal to the radio signal transmitting/receiving unit 1. The input/output apparatus 4 contains a keypad (not shown) and a display unit (not shown either). The keypad is used to enter a telephone number, an operation mode, and the like. The telephone number, the operation mode, and the like, which are entered from this keypad, are supplied to the control unit 5. Also, the display unit displays, for instance, numbers inputted from the keypad, and conditions of this radio terminal apparatus, namely such a message as to whether or not this radio terminal apparatus is located within a communication available area. The display contents of this display unit are controlled based upon control data supplied from the control unit 5.

The control unit 5 controls the overall arrangement of the radio terminal apparatus. Concretely speaking, this control unit 5 analyzes the signals supplied from the keypad of the input/output apparatus 4, and executes process operations in accordance with the analysis result. Also, the control unit 5 causes the display unit employed in the input/output apparatus 4 to display various messages. Furthermore, this control unit 5 analyzes a control signal derived from the radio signal transmitting/receiving unit 1, and also produces another control signal to be supplied to the radio signal transmitting/receiving unit 1. To this control unit 5, the memory unit 6 is connected. The memory unit 6 stores therein a control program and various sorts of data used by the control unit 5.

The power supply control unit 7 controls a power supply for the radio signal transmitting/receiving unit 1 as the receiving circuit to be turned ON/OFF. The turn-ON/OFF timing of this power supply is determined based upon the operation mode (MOD), the number of times of continuous reception "Np" of the call signal, and the remaining battery power quantity "B".

As previously explained, the operation mode (MOD) is entered from the keypad of the input/output apparatus 4. When the operation mode is inputted, the control unit 5 supplies a signal indicative of this operation mode to the power supply control unit 7. The information indicative of the number of times of continuous reception "Np" of the call signal is transmitted via the control channel from the radio base station control apparatus. In the case that the control unit 5 receives the information indicative of the number of times of continuous reception "Np" via the radio signal transmitting/receiving circuit 1, this control unit 5 supplies a signal representative of the number of times of continuous reception "Np" to the power supply control unit 7. The remaining battery power quantity "B" is sent from the remaining battery power detecting unit 8 (will be discussed later).

It is now assumed in this embodiment 1 that the radio terminal apparatus has three operation modes. That is, in the first operation mode (MOD=1), the power supply of the radio signal transmitting/receiving circuit 1 is turned ON only during 1 frame within each of battery power saving time periods without regard to the number of times of continuous reception Np of the call signal, and the remaining battery power quantity B. In the second operation mode (MOD=2), the timing at which the power supply of the radio signal transmitting/receiving circuit 1 is turned ON is determined based upon the number of times of continuous reception Np of the call signal and the remaining battery power quantity. In the third operation mode (MOD=3), the timing at which the power supply of the radio signal transmitting/receiving circuit 1 is turned ON is determined in accordance with the number of times of continuous reception Np of the call signal without regard to the remaining battery power quantity B.

The remaining battery power detecting unit 8 detects the remaining battery power quantity of the battery 10. From this remaining battery power detecting unit 8, such a signal is supplied to the power supply control unit 7, namely this signal indicates that while a full charging condition is selected as 100%, a present charging condition is expressed by a ratio (%).

In the radio terminal apparatus with the abovedescribed arrangement, the user inputs the operation mode (MOD) from the input/output apparatus under call waiting state. If there is no input, this radio terminal apparatus is operated under operation mode of MOD=2, i.e., default. Also, the control unit 5 stores into the memory unit 6 the number of times of continuous reception "Np" of the call signal notified by using the control channel when the location of the radio terminal apparatus is registered. Then, when the location registering operation is completed, the control unit 5 is brought into the call waiting state while supplying the signal indicative of the operation mode (MOD) and the signal indicative of the number of times of continuous reception Np of the call signal to the power supply control unit 7.

Referring now to drawings, a description will be made of operations when the radio terminal apparatus is under call waiting state.

Figure 5A:
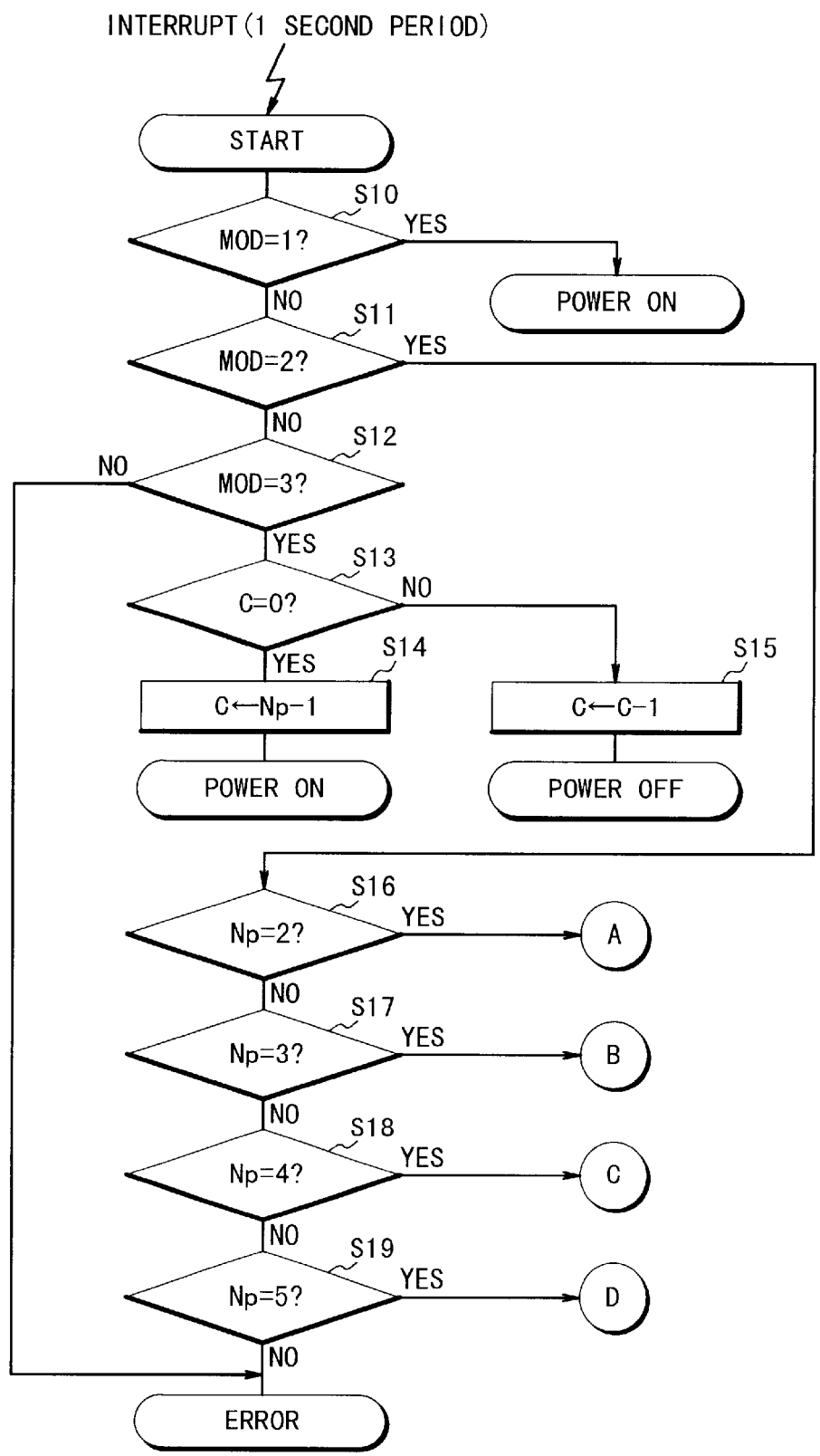
Figure 5B:
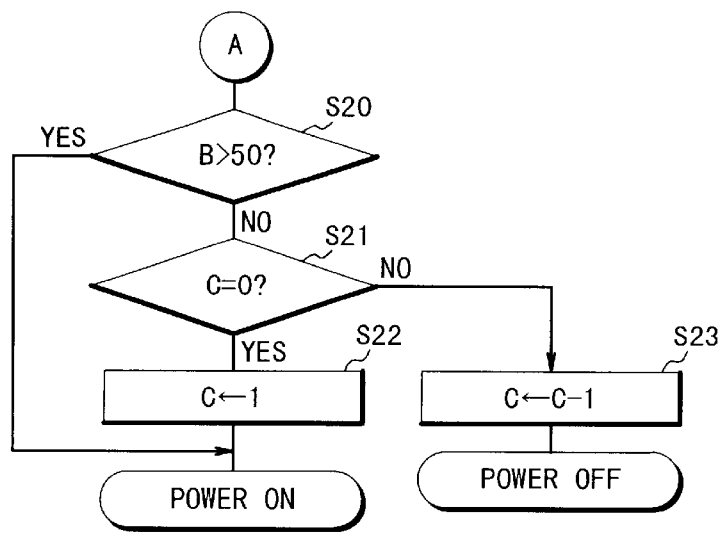

FIG. 5A to FIG. 5B are flow charts for describing operations of the power supply control unit 7. The power supply control unit 7 is initiated by an interrupt signal produced in a 1 second time period in synchronism with such timing that the own call signal is sent out from the radio base station control apparatus. It should be noted that the above-explained timing corresponds to timing of a calling block of a radio terminal apparatus, which is allocated when the location of this radio terminal apparatus is registered.

When the interrupt signal is issued, first of all, a check is made as to whether or not "MOD=1" is designated as the operation mode (step S10). When it is so judged that "MOD=1" is designated, a process operation corresponding to the first operation mode is carried out. That is, the power supply of the radio signal transmitting/receiving circuit 1 is turned ON. The time period during which this power supply is turned ON is equal to such a time period corresponding to 1 frame to 3 frames. Thereafter, the process operation executed in this power supply control unit 7 is accomplished. As a result, the power supply of the radio signal transmitting/receiving circuit 1 is turned ON only during 1 frame to 3 frames in a each battery power saving period, namely 1 second time period.

Conversely, when it is so judged at the above step S10 that "MOD=1" is not designated, another check is subsequently made as to whether or not "MOD=2" is designated (step S11). When it is so judged at this step that "MOD=2" is designated, the process operation is branched to a step S16 at which a process operation corresponding to the second operation mode is carried out (will be explained in detail).

Conversely, when it is so judged at the above step S11 that "MOD=2" is not designated, another check is subsequently made as to whether or not "MOD=3" is designated (step S12). When it is so judged at this step that "MOD=3" is designated, a process operation corresponding to the third operation mode is carried out. That is, a check is done as to whether or not a count content of a counter C (not shown) provided in this power supply control unit 7 is equal to zero (step S13). Then, if it is judged that the count content is equal to zero, then such a value obtained by subtracting "1" from the number of times of continuous reception Np of the call signal is set to the counter C (step S14). Thus, the power supply of the radio signal transmitting/receiving circuit 1 is turned ON. On the other hand, when it is so judged that the count content of the counter C is not equal to zero, this count content of the counter C is decreased by 1 (step S15). Thus, the power supply of the radio signal transmitting/receiving circuit 1 is turned ON. When such a judgement is made at the step S12 that MOD=3 is not designated, the power supply control unit 7 recognizes that an error happens to occur, and therefore the process operation is advanced to an error process operation (not shown in detail).

Based upon the above-described process operation, in the case of MOD=3, the power supply of the radio signal transmitting/receiving unit 1 is turned ON/OFF in the battery power saving time period of ON:OFF=1:Np−1 without regard to the remaining battery power quantity B. For instance, in the case of Np=4, when Np−1 is set to the counter C at the step S14, the judgment results become "NO" during the subsequent three interrupt operations at the step S13, so that only the count content of the counter C is decreased. As a consequence, when the power supply of the radio signal transmitting/receiving unit 1 is turned ON in a certain battery power saving period, the power supply of the radio signal transmitting/receiving unit 1 is not turned ON during the three subsequent battery power saving periods. In other words, the power supply of the radio transmitting/receiving circuit 1 is caused to be turned ON only during one battery power saving period among the four continuous battery power saving periods.

In the process operation with respect to the second operation mode (MOD=2), the time periods during which the power is supplied to the radio signal transmitting/receiving circuit 1 (will be referred to as a "power supplying period" hereinafter) are different from each other, depending upon the number of times of continuous reception Np of the call signal and the remaining battery power quantity B. This power supplying time period is constructed of a plurality of battery power saving periods.

In this MOD=2 process operation, a check is first made as to whether or not the number of times of continuous reception Np of the call signal is equal to 2 (step S16). This process operation is carried out by investigating such a signal indicative of the number of times of continuous reception Np sent from the control unit 5. Then, when it is so judged that Np=2, the process operation is branched to a further step S20 at which the process operation with respect to Np=2 is performed. Conversely, when it is so judged at the above step S16 that Np is not equal to 2, another check is done as to whether or not Np=3 (step S17). Then, if it is so judged that Np=3, then the process operation is branched to a step S30 at which the process operation with respect to Np=3 is carried out. Conversely, when it is so judged at the step S17 that Np is not equal to 3, next, another check is made as to whether or not Np=4 (step S18). Then, when it is so judged that Np=4, the process operation is branched to a step S40 at which the process operation for Np=4 is performed. Similarly, when it is so judged at the above step S18 that Np is not equal to 4, a further check is made as to whether or not Np=5 (step S18). Then, when it is so judged that Np=5, the process operation is branched at a step S60 at which the process operation with respect to Np=5 is performed. If it is so judged at the step S19 that Np is not equal to 5, the power supply control unit 7 recognizes that an error happens to occur, and thus the process operation is advanced to an error process operation (not shown in detail).

In the process operation with respect to Np=2, as shown in FIG. 5B, a first check is done as to whether or not the remaining battery power quantity B is larger than 50% (step S20). When the remaining battery power quantity B is larger than 50%, the power supply of the radio signal transmitting/receiving circuit 1 is turned ON. As a result, in this case, the power supply of the radio signal transmitting/receiving unit 1 is turned ON in each battery power saving period (1 second time period).

When it is judged at the above step S20 that the remaining battery power quantity B is smaller than, or equal to 50%, another check is made as to whether or not the count content of the counter C is equal to zero (step S21). If it is so judged that the count content is equal to zero, then "1" is set to this counter C (step S22). Then, the power supply of the radio signal transmitting/receiving circuit 1 is turned ON. On the other hand, when it is so judged at the step S21 that the count content of the counter C is not equal to zero, the count content of the counter C is decreased by 1 (step S23). Then, the power supply of the radio signal transmitting/receiving circuit 1 is not turned ON. As a consequence, when the remaining battery power quantity B is smaller than, or equal to 50%, the power supplying period is constituted by two sets of the battery power saving periods, and the power supply of the radio signal transmitting/receiving circuit 1 is alternately turned ON in the battery power saving period.

With employment of the above-described process operation for Np=2, when the remaining battery power quantity B is large (namely, larger than 50%), the power is supplied to the radio signal transmitting/receiving circuit 1 every the battery power saving period. However, when the remaining battery power quantity B is small (smaller than, or equal to 50%), the power is supplied to the radio transmitting/receiving circuit 1 during only one battery power saving period among the two battery power saving periods. As a consequence, when the remaining battery power quantity is small, the power consumption is lowered, so that the lifetime of the battery 10 can be extended.

Figure 5C:
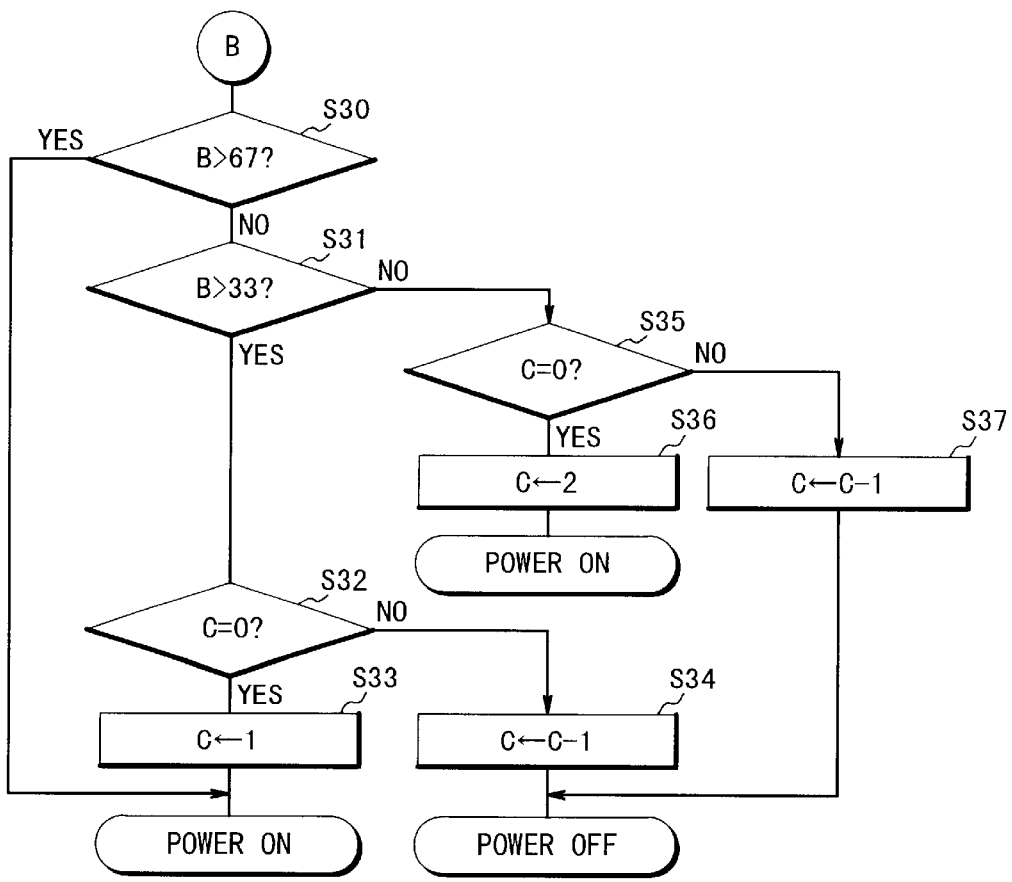

In the process operation with respect to Np=3, as shown in FIG. 5C, a first check is done as to whether or not the remaining battery power quantity B is larger than 67% (step S30). When the remaining battery power quantity B is larger than 67%, the power supply of the radio signal transmitting/receiving circuit 1 is turned ON. As a result, in this case, the power supply of the radio signal transmitting/receiving unit 1 is turned ON in each battery power saving period (1 second time period).

When it is judged at the above step S30 that the remaining battery power quantity B is smaller than, or equal to 67%, another check is made as to whether or not the remaining battery power quantity B is greater than 33% (step S31). When it is so judged at this step that this remaining battery power quantity is greater than 33%, process operations similar to those defined at the steps S21 to S23 are carried out (steps S32 to S34). In such a case that the remaining battery power quantity B is smaller than, or equal to 67% and also is greater than 33%, the power supplying period is constituted by 2 battery power saving periods, and the power supply of the radio signal transmitting/receiving circuit 1 is turned ON in the alternate battery power saving periods.

When it is judged at the above step S31 that the remaining battery power quantity B is smaller than, or equal to 33%, another check is made as to whether or not the count content of the counter C is equal to zero (step S35). If it is so judged that the count content is equal to zero, then "2" is set to this counter C (step S36). Then, the power supply of the radio signal transmitting/receiving circuit 1 is turned ON. On the other hand, when it is so judged at the step S35 that the count content of the counter C is not equal to zero, the count content of the counter C is decreased by 1 (step S37). Then, the power supply of the radio signal transmitting/receiving circuit 1 is not turned ON. As a consequence, when the remaining battery power quantity B is smaller than, or equal to 33%, the power supplying period is constituted by three sets of the battery power saving periods, and the power supply of the radio signal transmitting/receiving circuit 1 is turned ON in one battery power saving period among the three battery power saving periods.

With employment of the above-described process operation for Np=3, when the remaining battery power quantity B is large (namely, larger than 67%), the power is supplied to the radio signal transmitting/receiving circuit 1 every the battery power saving period. When the remaining battery power quantity B is medium (namely, smaller than, or equal to 67%, and larger than 33%), the power is supplied to the radio signal transmitting/receiving circuit 1 only during one battery power saving period among the two battery power saving periods. However, when the remaining battery power quantity B is small (smaller than, or equal to 33%), the power is supplied to the radio transmitting/receiving circuit 1 during only one battery power saving period among the three battery power saving periods. As a consequence, when the remaining battery power quantity is small, the power consumption is lowered, so that the lifetime of the battery 10 can be extended.

In the process operation with respect to Np=4, as shown in FIG. 5D, a first check is done as to whether or not the remaining battery power quantity B is larger than 75% (step S40). When the remaining battery power quantity B is larger than 75%, the power supply of the radio signal transmitting/receiving circuit 1 is turned ON. As a result, in this case, the power supply of the radio signal transmitting/receiving unit 1 is turned ON in each battery power saving period (1 second time period), as indicated in FIG. 6F.

When it is so judged at the above step S40 that the remaining battery power quantity B is smaller than, or equal to 75%, another check is subsequently made as to whether or not the remaining battery power quantity B is larger than 50% (step S41). In this step S41, when it is so judged that the remaining battery power quantity B is larger than 50%, process operations similar to those defined at the steps S21 to S23 are carried out (steps S42 to S44). As a consequence, in such a case that the remaining battery power quantity B is smaller than, or equal to 75% and is larger than 50%, the power supplying period is constituted by two battery power saving periods, and as indicated in FIG. 6G, the power supply of the radio signal transmitting/receiving circuit 1 is turned ON in the alternate battery power saving periods.

When it is so judged at the step S41 that the remaining battery power quantity B is smaller than, or equal to 50%, another check is made as to whether or not the remaining battery power quantity B is larger than 25% (step S45). At this step, when it is so judged that the remaining battery power quantity B is larger than 25%, process operations similar to those defined at the above steps S35 to S37 are carried out (steps S46 to S48). As a result, in such a case that the remaining battery power quantity B is smaller than, or equal to 50%, and also is larger than 25%, the power supplying period is constituted by three sets of battery power saving periods, and as shown in FIG. 6H, the power supply of the radio signal transmitting/receiving circuit 1 is turned ON during one battery power saving period among these three battery power saving periods.

When it is judged at the above step S45 that the remaining battery power quantity B is smaller than, or equal to 25%, another check is made as to whether or not the count content of the counter C is equal to zero (step S49). If it is so judged that the count content is equal to zero, then "3" is set to this counter C (step S50). Then, the power supply of the radio signal transmitting/receiving circuit 1 is turned ON. On the other hand, when it is so judged at the step S49 that the count content of the counter C is not equal to zero, the count content of the counter C is decreased by 1 (step S51). Then, the power supply of the radio signal transmitting/receiving circuit 1 is not turned ON. As a consequence, when the remaining battery power quantity B is smaller than, or equal to 25%, the power supplying period is constituted by four sets of the battery power saving periods, and the power supply of the radio signal transmitting/receiving circuit 1 is turned ON in one battery power saving period among the four battery power saving periods, as shown in FIG. 6I.

With employment of the above-described process operation for Np=4, when the remaining battery power quantity B is very large (namely, larger than 75%), the power is supplied to the radio signal transmitting/receiving circuit 1 every the battery power saving period. When the remaining battery power quantity B is large (namely, smaller than, or equal to 75%, and also larger than 50%), the power is supplied to the radio signal transmitting/receiving circuit 1 only during one battery power saving period among the two battery power saving periods. However, when the remaining battery power quantity B is small (smaller than, or equal to 50% and also larger than 25%), the power is supplied to the radio transmitting/receiving circuit 1 during only one battery power saving period among the three battery power saving periods. In the case that the remaining battery power quantity B is very small (smaller than, or equal to 25%), the power is supplied to the radio signal transmitting/receiving circuit 1 only during one battery power saving period among the four battery power saving periods. As a consequence, when the remaining battery power quantity becomes small, the power consumption is lowered, so that the lifetime of the battery 10 can be extended.

Figure 5E:
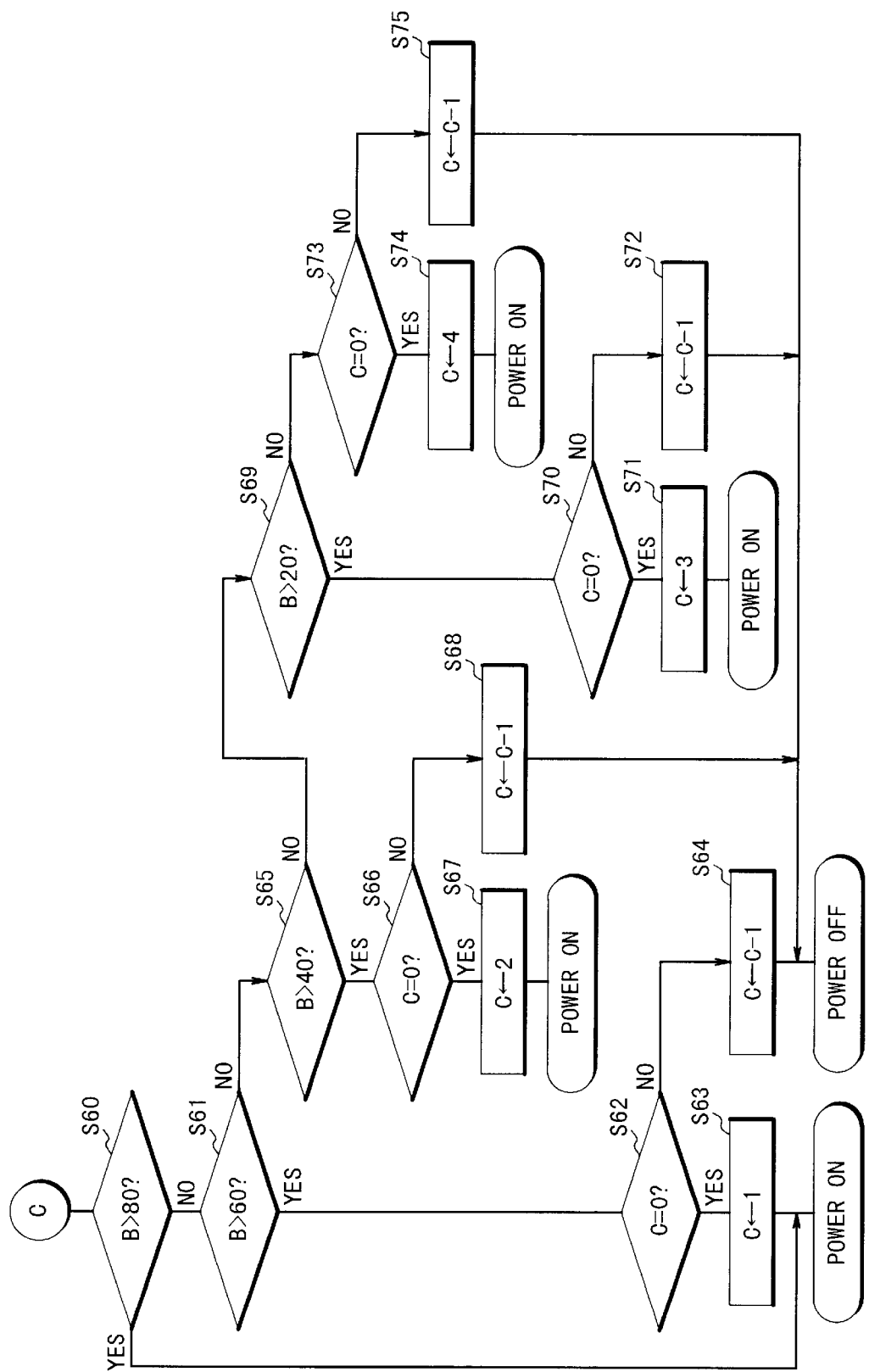

In the process operation with respect to Np=5, as shown in FIG. 5E, a first check is done as to whether or not the remaining battery power quantity B is larger than 80% (step S60). When the remaining battery power quantity B is larger than 80%, the power supply of the radio signal transmitting/receiving circuit 1 is turned ON. As a result, in this case, the power supply of the radio signal transmitting/receiving unit 1 is turned ON in each battery power saving period (1 second time period), as shown in FIG. 7A.

When it is so judged at the above step S60 that the remaining battery power quantity B is smaller than, or equal to 80%, another check is subsequently made as to whether or not the remaining battery power quantity B is larger than 60% (step S61). In this step S61, when it is so judged that the remaining battery power quantity B is larger than 60%, process operations similar to those defined at the steps S21 to S23 are carried out (steps S62 to S64). As a consequence, in such a case that the remaining battery power quantity B is smaller than, or equal to 80% and is larger than 60%, the power supplying period is constituted by two battery power saving periods, and as indicated in FIG. 7B, the power supply of the radio signal transmitting/receiving circuit 1 is turned ON in the alternate battery power saving periods.

When it is so judged at the step S61 that the remaining battery power quantity B is smaller than, or equal to 60%, another check is made as to whether or not the remaining battery power quantity B is larger than 40% (step S65). At this step, when it is so judged that the remaining battery power quantity B is larger than 40%, process operations similar to those defined at the above steps S35 to S37 are carried out (steps S66 to S68). As a result, in such a case that the remaining battery power quantity B is smaller than, or equal to 60%, and also is larger than 40%, the power supplying period is constituted by three sets of battery power saving periods, and as shown in FIG. 7C, the power supply of the radio signal transmitting/receiving circuit 1 is turned ON during one battery power saving period among these three battery power saving periods.

When it is so judged at the step S65 that the remaining battery power quantity B is smaller than, or equal to 40%, another check is made as to whether or not the remaining battery power quantity B is larger than 20% (step S69). At this step, when it is so judged that the remaining battery power quantity B is larger than 20%, process operations similar to those defined at the above steps S49 to S51 are carried out (steps S70 to S72). As a result, in such a case that the remaining battery power quantity B is smaller than, or equal to 40%, and also is larger than 20%, the power supplying period is constituted by four sets of battery power saving periods, and as shown in FIG. 7D, the power supply of the radio signal transmitting/receiving circuit 1 is turned ON during one battery power saving period among these four battery power saving periods.

When it is judged at the above step S69 that the remaining battery power quantity B is smaller than, or equal to 20%, another check is made as to whether or not the count content of the counter C is equal to zero (step S73). If it is so judged that the count content is equal to zero, then "4" is set to this counter C (step S74). Then, the power supply of the radio signal transmitting/receiving circuit 1 is turned ON. On the other hand, when it is so judged at the step S73 that the count content of the counter C is not equal to zero, the count content of the counter C is decreased by 1 (step S75). Then, the power supply of the radio signal transmitting/receiving circuit 1 is not turned ON. As a consequence, when the remaining battery power quantity B is smaller than, or equal to 20%, the power supplying period is constituted by five sets of the battery power saving periods, and the power supply of the radio signal transmitting/receiving circuit 1 is turned ON only in one battery power saving period among the five battery power saving periods, as shown in FIG. 7E.

With employment of the above-described process operation for Np=5, when the remaining battery power quantity B is very large (namely, larger than 80%), the power is supplied to the radio signal transmitting/receiving circuit 1 every the battery power saving period. When the remaining battery power quantity B is large (namely, smaller than, or equal to 80%, and also larger than 60%), the power is supplied to the radio signal transmitting/receiving circuit 1 only during one battery power saving period among the two battery power saving periods. When the remaining battery power quantity B is medium (smaller than, or equal to 60%, and larger than 40%), the power is supplied to the radio signal transmitting/receiving circuit 1 only during one battery power saving period among the three battery saving periods. Then, when the remaining battery power quantity B is small (smaller than, or equal to 40%, and also larger than 20%), the power is supplied to the radio signal transmitting/receiving circuit 1 only during one battery power saving period among the four battery power saving periods. In the case that the remaining battery power quantity B is very small (smaller than, or equal to 20%), the power is supplied to the radio signal transmitting/receiving circuit 1 only during one battery power saving period among the five battery power saving periods. As a consequence, when the remaining battery power quantity becomes small, the power consumption is lowered, so that the lifetime of the battery 10 can be extended.

It should be noted that while the process operations for Np=2 to 5 have been explained above, the radio terminal apparatus of this embodiment 1 may be arranged by performing a process operation similar thereto when Np=more than 6.

Alternatively, in the case that when the power supply of the radio signal transmitting/receiving unit 1 is turned ON, the data transmitted by using the control channel cannot be received continuously two times, the control unit 5 may be so arranged that the frequency of the control channel is scanned, and the control channel (radio base station apparatus) is changed into such a control channel whose the reception signal field strength is the highest strength. In this alternative case, the control unit 5 may be arranged in such a manner that after the location registering operation is again carried out, if necessary, the radio terminal apparatus is again set to the call waiting state, and then a process operation is carried out in accordance with the above-explained operation mode MOD, the number of times of continuous reception Np of calling signal, and the remaining battery power quantity B.

For a more better understanding of the present invention, the process operation in the case of MOD=2 and Np=4 will now be described more in detail with reference to FIG. 6A to FIG. 6I. As represented in FIG. 6A, the time period during which the calling signal is transmitted from the radio base station apparatus is 1 second. In the radio terminal apparatus operated under call waiting state, the time period during which the power supply of the radio signal transmitting/receiving unit 1 is turned ON is similarly 1 second in synchronism with the above-described transmission time period of the calling signal, as shown in FIG. 6B. As a consequence, as illustrated in FIG. 6C and 6D by changing the scales, the transmission time period of the calling signal is synchronized with the battery power saving period.

Also, as represented in FIG. 6E, the calling signal from the radio base station control apparatus is repeatedly sent four times. Assuming now that a block 3 (B3) is equal to a channel used to call the radio terminal apparatus, when the remaining battery power quantity is larger than 75%, this radio terminal apparatus causes the power supply of the radio signal transmitting/receiving unit 1 to be turned ON one time per 1 second at the timing of this block 3. Also, when the remaining battery power quantity is smaller than, or equal to 75%, and also is greater than 50%, the radio terminal apparatus causes the power supply of the radio signal transmitting/receiving unit 1 to be turned ON one time per 2 seconds at the timing of this block 3. When the remaining battery power quantity is smaller than, or equal to 50% and also is larger than 25%, the radio terminal apparatus causes the power supply of the radio transmitting/receiving unit 1 to be turned ON one time per 3 seconds at the timing of this block 3. Further, when the remaining battery power quantity is smaller than, or equal to 25%, the radio terminal apparatus causes the power supply of the radio signal transmitting/receiving unit 1 to be turned ON one time per 4 seconds at the timing of this block 3.

Figure 8:
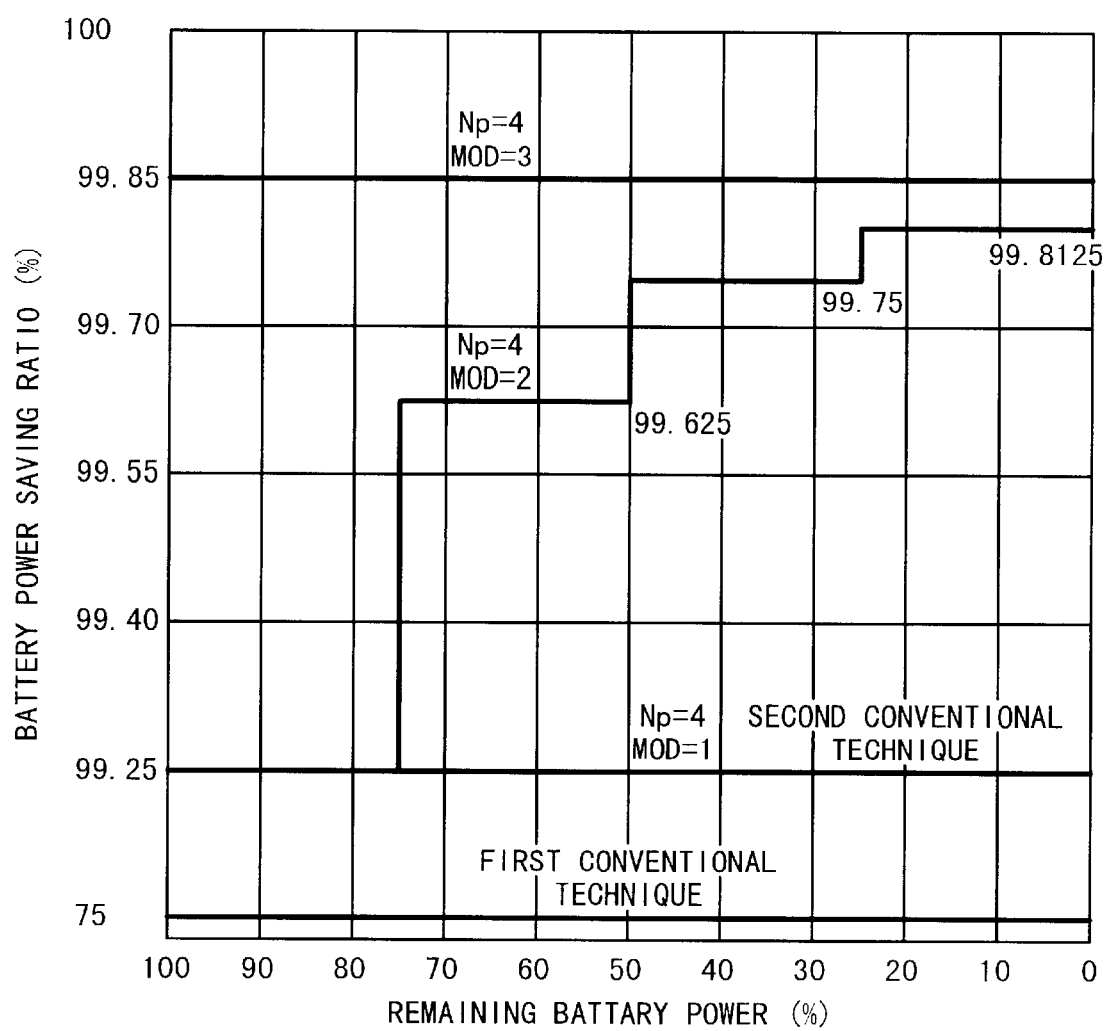
FIG. 8 is a graphic representation for showing a relationship between a battery power saving rate and remaining battery power quantity in the case of Np=4 in the embodiment 1 of the present invention.

FIG. 8 graphically shows a relationship between the battery power saving ratio and the remaining battery power quantity in this case, and an ordinate thereof indicates the battery power saving ratio, whereas an abscissa thereof represents the remaining battery power quantity. When the remaining battery power quantity is larger than 75%, the battery power saving ratio becomes 99.25%. When the remaining battery power quantity is larger than 50% and smaller than, or equal to 75%, the battery power saving ratio becomes 99.625%. When the remaining battery power quantity is larger than 25% and smaller than, or equal to 50%, the battery power saving ratio becomes 99.75%. when the remaining battery power quantity is smaller than 25%, the battery power saving ratio becomes 99.8125%.

Similarly, the process operation in the case of MOD=2 and Np=5 will now be described more in detail with reference to FIG. 7A to FIG. 7E. Assuming now that a block 3 (B3) is equal to a channel used to call the radio terminal apparatus, when the remaining battery power quantity is larger than 80%, this radio terminal apparatus causes the power supply of the radio signal transmitting/receiving unit 1 to be turned ON one time per 1 second at the timing of this block 3. Also, when the remaining battery power quantity is smaller than, or equal to 80%, and also is greater than 60%, the radio terminal apparatus causes the power supply of the radio signal transmitting/receiving unit 1 to be turned ON one time per 2 seconds at the timing of this block 3. When the remaining battery power quantity is lager than 40% and also is smaller than, or equal to 60%, the radio terminal apparatus causes the power supply of the radio transmitting/ receiving unit 1 to be turned ON one time per 3 seconds at the timing of this block 3. Further, when the remaining battery power quantity is smaller than, or equal to 20%, the radio terminal apparatus causes the power supply of the radio signal transmitting/receiving unit 1 to be turned ON one time per 5 seconds at the timing of this block 3.

Figure 9:
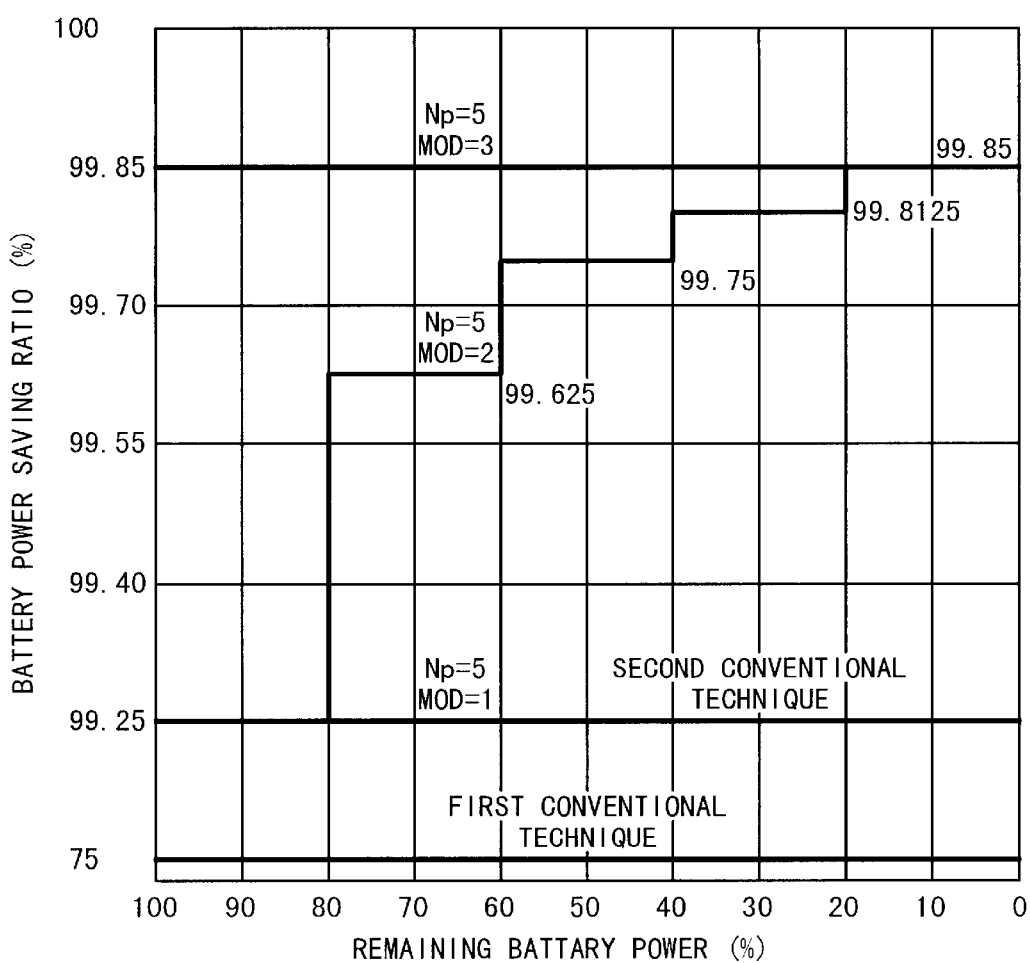
FIG. 9 is a graphic representation for showing a relationship between a battery power saving rate and remaining battery power quantity in the case of Np=5 in the embodiment 1 of the present invention.

FIG. 9 graphically shows a relationship between the battery power saving ratio and the remaining battery power quantity in this case, and an ordinate thereof indicates the battery power saving ratio, whereas an abscissa thereof represents the remaining battery power quantity. When the remaining battery power quantity is larger than 80%, the battery power saving ratio becomes 99.25%. When the remaining battery power quantity is larger than 60% and smaller than, or equal to 80%, the battery power saving ratio becomes 99.625%. When the remaining battery power quantity is larger than 40% and smaller than, or equal to 60%, the battery power saving ratio becomes 99.75%. When the remaining battery power quantity is larger than 20% and smaller than, or equal to 40%, the battery power saving ratio becomes 99.8125%. When the remaining battery power quantity is smaller than, or equal to 20%, the battery power saving ratio becomes 99.85%.

EMBODIMENT 2

Figure 10:
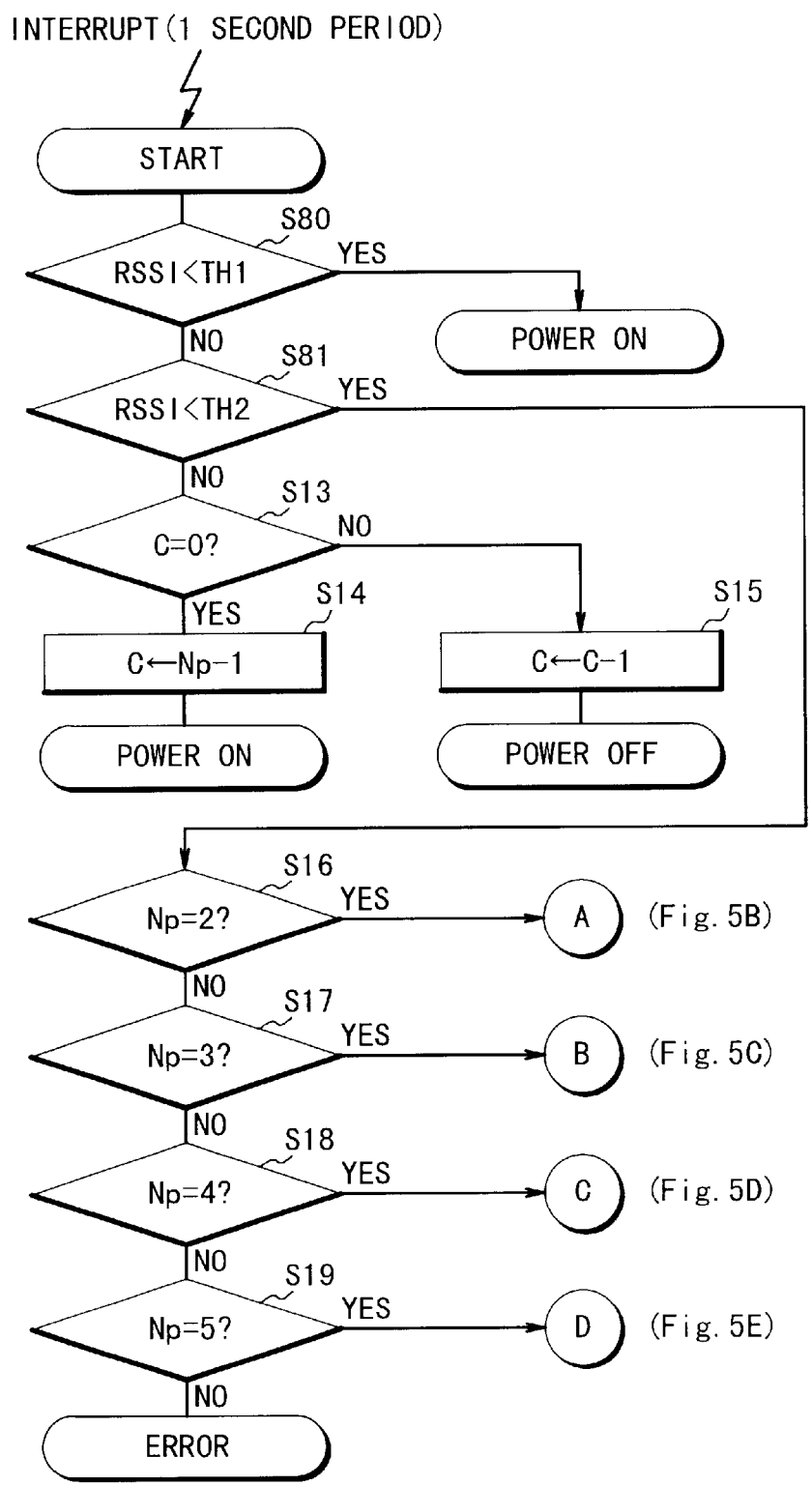
FIG. 10 is a flow chart for describing operations of a power supply control unit of a radio terminal apparatus according to an embodiment 2 of the present invention.

Referring now to FIG. 4A, FIG. 4B and FIG. 10, a radio terminal apparatus according to an embodiment 2 of the present invention will be described. It should be noted that an arrangement of this radio terminal apparatus according to this embodiment 2 is identical to that of the above-described embodiment 1 (see FIG. 4A and FIG. 4B). This radio terminal apparatus owns the following different technical point from that of the embodiment 1. That is, the power supply of the radio signal transmitting/receiving circuit 1 is turned ON/OFF in response to not the operation mode instructed by the operator, but a reception signal field strength RSSI of the control channel. The reception signal field strength RSSI is measured by the control unit 5 when the power supply of the radio signal transmitting/receiving unit 1 is turned ON, and then this measured reception signal field strength RSSI is notified to the power supply control unit 7.

Precisely speaking, when the measured reception signal field strength RSSI is a low level (weak level), the power supply of the radio signal transmitting/receiving circuit 1 is turned ON only during one frame period within the respective battery power saving periods irrelevant to the number of times of continuous reception of the call signal and the remaining battery power quantity. When the measured signal reception filed strength RSSI is a medium level, the ON-timing of the power supply of the radio signal transmitting/receiving circuit 1 is determined based on the number of times of continuous reception of the call signal and the remaining battery power quantity. When the measured reception signal field strength RSSI is a high level, the ON-timing of the power supply of the radio signal transmitting/receiving circuit 1 is determined in response to the number of times of continuous reception of the call signal, irrelevant to the remaining battery power quantity.

FIG. 10 is a flow chart for explaining operations of the power supply control unit 7. It should be noted that the same reference numerals shown in the steps of the flow chart of the embodiment 1 will be employed as those for denoting the same, or similar steps of this flow chart shown in FIG. 10. The power supply control unit 7 is initiated by an interrupt signal produced in a 1 second time period in synchronism with such timing that the own call signal is sent out from the radio base station control apparatus. It should be noted that the above-explained timing corresponds to timing of a calling block of a radio terminal apparatus, which is allocated when the location of this radio terminal apparatus is registered.

When the interrupt signal is issued, first of all, a check is made as to whether or not the reception signal field strength RSSI is lower than a preselected threshold value TH1 (step S80). At this step, when it is so judged that the reception signal field strength RSSI is lower than this threshold value TH1, the power supply of the radio signal receiving circuit 1 is turned ON. This operation is identical to that of such a condition MOD=1 in the embodiment 1. As a result, the power supply of the radio signal transmitting/receiving circuit 1 is turned ON in each battery power saving period, 1-second time period.

Then, when it is so judged at the above step S80 that the reception signal field strength RSSI is higher than, or equal to the threshold value TH1, another check is made as to whether or not this reception signal field strength RSSI is lower than, or equal to another threshold value TH2 (note that TH2>TH1) at a step S81. When it is so judged at this step S81 that the reception signal field strength RSSI is not lower than, or equal to this threshold value TH2, namely is not higher than this threshold value TH2, the update process operation of the counter C is carried out similar to the embodiment 1 (step S13 to S15). As a result, the power supply of the radio signal transmitting/receiving unit 1 is turned ON/OFF based upon the number of times of continuous reception Np of the call signal irrelevant to the remaining battery power quantity B. This operation is the same as that of the case MOD=3 in the embodiment 1.

On the other hand, when it is so judged that the reception signal field strength RSSI is lower than, or equal to the threshold value TH2, the sequential operation is branched to a step S16. Since the subsequent process operations after this step S16 are identical to those of the case of MOD=2 in the embodiment 1, the explanations thereof are omitted.

Also, in this embodiment 2, the control unit 5 is arranged by that if the data could not be continuously received two times, which is transmitted by using the control channel when the power supply of the radio signal transmitting/ receiving unit 1 is turned ON, the control unit 5 scans the frequency of the control channel in order that the presently used control channel is replaced by such a control channel with the highest reception signal strength. In this case, if required, the control unit 5 may be arranged as follows. After the location registering operation is retried, the radio terminal apparatus is again brought into the above-described call waiting state, and then such a process operation may be carried out in accordance with the above-described operation mode MOD, the number of times of continuous reception Np of the call signal, and the remaining battery power quantity B.

Also, in that above-described embodiment 2, when the reception signal field strength RSSI is higher than, or equal to the threshold value TH1 and further is lower than, or equal to the threshold value TH2, the power supply of the radio signal transmitting/receiving circuit 1 is controlled, depending on the remaining battery power quantity B. Alternatively, it is possible to control the power supply of the radio signal transmitting/receiving circuit 1 irrelevant to the remaining battery power quantity B. In this alternative case, the reception signal field strength RSSI is further subdivided for a fine control. This example will now be explained.

For instance, in such a case that Np=2, the power supply of the radio signal transmitting/receiving circuit 1 is turned ON only one time per 2 seconds when the reception signal field strength RSSI>the threshold value TH3, and is turned ON only one time per 1 second when RSSI≦TH3. In such a case that Np=3, the power supply of the radio signal transmitting/receiving circuit 1 is turned ON only one time per 3 seconds when the reception signal field strength RSSI>the threshold value TH4, and is turned ON only one time per 2 seconds when TH5<RSSI≦TH4, and further is turned ON only one time per 1 second when RSSI<TH5. It should be understood that the threshold value TH4>the threshold value TH5. In such a case that Np=4, the power supply of the radio signal transmitting/receiving circuit 1 is turned ON only one time per 4 seconds when the reception signal field strength RSSI>the threshold value TH6; is turned ON only one time per 3 seconds when TH7<RSS≦TH6; is turned ON only one time per 2 seconds when TH8<RSSI≦TH7; and also is turned ON only one time per 1 second when RSSI<TH8. It should also be noted that the threshold value relationship is given as TH6<TH7<TH8. In such a case that Np=5, the power supply of the radio signal transmitting/receiving circuit 1 is turned ON only one time per 5 seconds when the reception signal field strength RSSI<the threshold value TH9; is turned ON only one time per 4 seconds when TH10<RSSI<TH9; is turned ON only one time per 3 seconds when TH11<RSSI<TH10; is turned ON only one time per 2 seconds when TH12<RSSI≦TH11; and further is turned ON only one time per 1 second when RSSI≦TH12. It should also be noted that the threshold value relationship is given as TH9<TH10>TH11>TH12.

As previously described in detail, according to the present invention, since the ON-time period of the power supply of the radio signal transmitting/receiving unit can be reduced, the lifetime of the battery employed in the radio terminal apparatus can be further prolonged.

Also, in accordance with the present invention, there are the following merits. That is, the ON/OFF ratio of the power supply of the radio signal transmitting/receiving unit can be changed based on the reception signal field strength of the control channel. Also, when the data cannot be continuously received from the control channel, the presently used control channel can be replaced by such a control channel with the highest reception signal field strength, and the location registering operation is retried, if necessary. As a consequence, the call signal can be firmly received.

What is claimed is:

1. A radio terminal apparatus comprising:
a signal receiving circuit for receiving an externally supplied signal;
a power supply for supplying electric power;
judging means for judging a reception signal field strength based on said externally supplied signal;
a power supply control unit for selectively varying a duty cycle for supplying the electric power from said power supply to said signal receiving circuit, said power supplied during a predetermined frame of a power supplying period, said duty cycle based on the reception signal field strength judged by said judging means; and said radio terminal apparatus further comprising:
a remaining power detecting unit for detecting remaining power of said power supply, and
wherein said power supply control unit:
intermittently supplies the electric power from said power supply to said signal receiving circuit for a predetermined time period irrelevant to the remaining power quantity detected by said remaining power detecting unit when said judging means judges that said reception signal field strength < a first predetermined value "A";
intermittently supplies the electric power from said power supply to said signal receiving circuit only within a time duration determined based on the remaining power quantity detected by said remaining power detecting unit when said judging means judges that a second predetermined value "B" ≧ said reception signal field strength ≧ said first predetermined value "A", said second predetermined value "B" being larger than said first predetermined value "A"; and
intermittently supplies the electric power from said power supply to said signal receiving circuit irrelevant to the remaining power detected by said remaining power detecting unit, based on a number of times of continuous reception of a call signal notified from a radio base station control apparatus via said radio base station apparatus when said judging means judges that said reception signal field strength > said second predetermined value "B".

2. A radio terminal apparatus according to claim 1, wherein when said judging means judges that said se cond predetermined value "B" ≧ said reception signal field strength ≧ said first predetermined value "A", said power supply control unit changes a time duration of supply of the electric power from said power supply to said signal receiving circuit based on said remaining power quantity detected by said remaining power detecting unit.

3. A mobile communication system comprising:
a radio base station control apparatus for controlling an entire system of said mobile communication system;
a radio base station apparatus connected to said radio base station control apparatus; and
a radio terminal apparatus for transmitting/receiving a radio signal to/from said radio base station apparatus,
wherein said radio terminal apparatus includes:
a signal receiving circuit for receiving an externally supplied signal;
a power supply for supplying electric power;
judging means for judging a reception signal field strength based on said externally supplied signal;
a power supply control unit for selectively varying a duty cycle for supplying the electric power from said power supply to said signal receiving circuit, said power supplied during a predetermined frame of a power supplying period, said duty cycle based on the reception signal field strength judged by said judging means; and
wherein said radio terminal apparatus further comprises a remaining power detecting unit for detecting remaining power of said power supply; wherein said power supply control unit:

intermittently supplies the electric power from said power supply to said signal receiving circuit for a predetermined time period irrelevant to the remaining power quantity detected by said remaining power detecting unit when said judging means judges that said reception signal field strength < a first predetermined value "A";

intermittently supplies the electric power from said power supply to said signal receiving circuit only within a time duration determined based on the remaining power quantity detected by said remaining power detecting unit when said judging means judges that a second predetermined value "B" ≧ said reception signal field strength ≧ said first predetermined value "A", said second predetermined value "B" being larger than said first predetermined value "A"; and intermittently supplies the electric power from said power supply to said signal receiving circuit irrelevant to the remaining power detected by said remaining power detecting unit, based on the numbers of times of continuous reception of the call signal notified from said radio base station control apparatus via said radio base station apparatus when said judging means judges that said reception signal field strength > said second predetermined value "B".

* * * * *